(12) United States Patent
Kelly et al.

(10) Patent No.: US 10,328,936 B2
(45) Date of Patent: Jun. 25, 2019

(54) VEHICLE SPEED CONTROL SYSTEM AND METHOD FOR LIMITING THE RATE OF ACCELERATION WHEN CHANGING FROM A FIRST TARGET SPEED TO A SECOND ONE DUE TO A REQUEST FROM THE ACCELERATOR PEDAL

(71) Applicant: Jaguar Land Rover Limited, Whitley, Coventry, Warwickshire (GB)

(72) Inventors: James Kelly, West Midlands (GB); Andrew Fairgrieve, Rugby (GB); Paul Beever, Rugby (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 15/311,813

(22) PCT Filed: Apr. 10, 2015

(86) PCT No.: PCT/EP2015/057889
§ 371 (c)(1),
(2) Date: Nov. 16, 2016

(87) PCT Pub. No.: WO2015/172952
PCT Pub. Date: Nov. 19, 2015

(65) Prior Publication Data
US 2017/0088135 A1 Mar. 30, 2017

(30) Foreign Application Priority Data
May 16, 2014 (GB) .................................. 1408703.5

(51) Int. Cl.
*B60W 10/06* (2006.01)
*B60W 30/14* (2006.01)
(Continued)

(52) U.S. Cl.
CPC .......... *B60W 30/146* (2013.01); *B60W 10/06* (2013.01); *B60W 10/184* (2013.01);
(Continued)

(58) Field of Classification Search
None
See application file for complete search history.

(56) References Cited

U.S. PATENT DOCUMENTS 5,665,026 A * 9/1997 Linden ................. B60K 31/047
180/170
2004/0249533 A1* 12/2004 Wheals ................... B60T 8/172
701/36
(Continued)

FOREIGN PATENT DOCUMENTS

GB 2505021 A 2/2014
GB 2508460 A 6/2014
(Continued)

OTHER PUBLICATIONS

Combined Search and Examination Report for application No. GB1408703.5, dated Nov. 26, 2014, 8 pages.
(Continued)

*Primary Examiner* — Jonathan M Dager
*Assistant Examiner* — Garrett F Evans
(74) *Attorney, Agent, or Firm* — Reising Ethington P.C.

(57) ABSTRACT

A speed control system configured automatically to cause a vehicle to operate in accordance with a first target speed value stored by the system at least in part by controlling an amount of drive torque applied to one or more wheels by a powertrain. The system is configured to receive a driver drive demand signal indicative of an amount of driver demanded drive torque to be applied to one or more wheels, and is configured to cause the vehicle to operate in accordance with a second target speed value greater than the first (Continued)

in dependence at least in part on the driver drive demand signal.

19 Claims, 9 Drawing Sheets

(51) Int. Cl.
*B60W 10/184* (2012.01)
*B60W 50/10* (2012.01)

(52) U.S. Cl.
CPC .......... *B60W 30/143* (2013.01); *B60W 50/10* (2013.01); *B60W 2520/26* (2013.01); *B60W 2540/04* (2013.01); *B60W 2540/10* (2013.01); *B60W 2550/148* (2013.01); *B60W 2720/10* (2013.01); *B60W 2720/106* (2013.01); *B60W 2720/30* (2013.01)

(56) References Cited

U.S. PATENT DOCUMENTS

| | | |
|---|---|---|
| 2005/0075826 A1 | 4/2005 | Kitazawa |
| 2010/0004808 A1* | 1/2010 | Tang ................. B60L 7/18 701/22 |
| 2010/0082216 A1 | 4/2010 | Yasui et al. |
| 2015/0217769 A1 | 8/2015 | Fairgrieve et al. |
| 2015/0232092 A1 | 8/2015 | Fairgrieve et al. |

FOREIGN PATENT DOCUMENTS

| | | |
|---|---|---|
| JP | H04203251 A | 7/1992 |
| JP | H0442187 Y2 | 10/1992 |
| JP | H08175222 A | 7/1996 |
| JP | 2000158974 A | 6/2000 |
| JP | 2005047304 A | 2/2005 |

OTHER PUBLICATIONS

International Search Report for International application No. PCT/EP2015/057889, dated Sep. 23, 2015, 4 pages.
Written Opinion for International application No. PCT/EP2015/057889, dated Sep. 23, 2015, 6 pages.
Japanese Office Action in Japanese with English summary for JP application No. 2016-567763, dated Aug. 1, 2017, 5 pages.

* cited by examiner

VEHICLE SPEED CONTROL SYSTEM AND METHOD FOR LIMITING THE RATE OF ACCELERATION WHEN CHANGING FROM A FIRST TARGET SPEED TO A SECOND ONE DUE TO A REQUEST FROM THE ACCELERATOR PEDAL

INCORPORATION BY REFERENCE

The content of patent applications WO2014/027069, GB2492748, GB2492655 and GB2499252 is incorporated herein by reference.

TECHNICAL FIELD

The present invention relates to vehicle speed control systems. In particular but not exclusively the invention relates to monitoring of vehicle speed control systems to ensure correct operation.

BACKGROUND

In known vehicle speed control systems, typically referred to as cruise control systems, the vehicle speed is maintained on-road once set by the user without further intervention by the user so as to improve the driving experience for the user by reducing workload.

With typical cruise control systems, the user selects a speed at which the vehicle is to be maintained, referred to as a set-speed, and the vehicle is maintained at a target speed that is set equal to the set-speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. If the user depresses the accelerator pedal by a sufficient amount the vehicle speed will increase, but once the user removes his foot from the accelerator pedal the vehicle reverts to the pre-set cruise speed (set-speed) by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TC system or TCS) or stability control system (SCS). Accordingly, they are not well suited to maintaining vehicle progress when driving in off road conditions where such events may be relatively common.

It is an aim of embodiments of the present invention to address disadvantages associated with the prior art.

SUMMARY OF THE INVENTION

Embodiments of the invention may be understood with reference to the appended claims.

Aspects of the present invention provide a system, a vehicle and a method.

In one aspect of the invention for which protection is sought there is provided a speed control system for a motor vehicle, the speed control system being configured to cause automatic operation of the vehicle in accordance with a first target speed value stored by the system at least in part by controlling automatically an amount of drive torque applied to one or more wheels by a powertrain, the speed control system being configured to receive an instantaneous driver drive demand signal in response to a prevailing driver displacement of an accelerator pedal; and wherein the speed control system is configured to determine a second target speed value greater than the first target speed value in dependence on the instantaneous driver drive demand signal; the system being further configured to cause automatic acceleration of the vehicle from the first target speed value to the second target speed value at a rate not exceeding a maximum acceleration.

This feature has the advantage that the speed control system continues to control vehicle speed even when a driver overrides the speed control system by depressing the accelerator pedal, i.e. changes in speed during a driver speed override intervention are controlled by the speed control system. Consequently, the speed control system is able to ensure that the rate of acceleration of the vehicle does not exceed a maximum acceleration value. This enables vehicle composure to be maintained even when the driver overrides the speed control system.

In some embodiments, if the instantaneous driver drive demand signal indicates a sufficiently large drive demand, such as a sufficiently large torque demand, the system may suspend limiting the rate of acceleration to the maximum acceleration value and permit the amount of drive demanded from the powertrain to correspond substantially to that instantaneously demanded by the driver drive demand signal. For example, the driver drive demand signal may correspond to a powertrain torque demand, and the driver drive demand signal may be conveyed to a powertrain controller which may in turn cause the powertrain to develop an amount of torque that is substantially equal to that demanded by a driver via the accelerator pedal.

Optionally, the system may be configured to cause the vehicle to accelerate from the first target speed value to the second target speed value according to a predetermined speed or acceleration profile.

Optionally, the predetermined speed or acceleration profile may be dependent on at least one vehicle parameter.

Optionally, the predetermined speed or acceleration profile may be dependent on the identity of a driving mode, selected from a plurality of driving modes, in which the vehicle is operating.

This feature has the advantage that the speed or acceleration profile may be selected to be one that is appropriate for the driving mode in which the vehicle is operating. For example, in the case the vehicle is operating in a driving mode appropriate to operation on a driving surface of relatively high surface coefficient of friction, or a driving mode appropriate to operation on sand, the speed or acceleration profile may correspond to a higher rate of acceleration than if the vehicle is operating in a driving mode appropriate to operation on a driving surface of relatively low surface coefficient of friction such as grass, gravel or snow, mud and ruts, or ice.

Optionally, the system may be configured to receive a signal indicative of the driving mode in which a user requires the vehicle to operate.

The system may be provided in combination with a user-operable driving mode control by means of which the signal indicative of the driving mode in which a user requires the vehicle to operate is generated.

The system may be provided in combination with automatic driving mode selection means configured to select automatically a driving mode appropriate to a driving surface over which a vehicle is driving when the vehicle is operated in an automatic driving mode selection mode.

The system may be provided in further combination with a user-operable automatic driving mode control input for selecting operation of the vehicle in the automatic driving mode selection mode.

Optionally, the system may be configured wherein the driving modes are control modes of at least one subsystem of a vehicle selected from amongst an engine management system, a transmission system, a steering system, a brakes system and a suspension system, the speed control system being provided in combination with a subsystem controller for initiating control of the or each of the vehicle subsystems in the selected one of the plurality of subsystem control modes, each of the subsystem control modes corresponding to one or more different driving surfaces.

It is to be understood that subsystem control modes may be provided that correspond to driving style, or any other suitable parameter. Driving style may for example be determined by the control system in dependence on user selection of a required driving style such as a performance oriented driving style, or an economy oriented driving style.

Optionally, the system may be configured to determine the maximum rate of acceleration of the vehicle in dependence at least in part on the first and second target speed values, the system being configured to limit the rate of acceleration according to the maximum rate.

Optionally, the system may be configured to monitor an amount of slip of one or more wheels of the vehicle whilst causing automatic acceleration of the vehicle from the first target speed value to the second target speed value, the system being configured to: reduce a net torque applied to one or more wheels in dependence on the amount of slip of one or more wheels thereby to reduce slip when slip exceeds a predetermined amount, or control a net torque applied to one or more wheels in dependence on the amount of slip of one or more wheels thereby to prevent slip from exceeding a predetermined amount.

The predetermined amount may be dependent on one or more vehicle parameters such as a speed of travel of a vehicle over a driving surface. The speed of travel over a driving surface may be determined by reference to one or more parameters such as a camera device, a radar system, a speed of one or more wheels such as an average speed of one or more wheels or a speed of a wheel that is not driven by a powertrain. Other methods of determining vehicle speed may be useful in addition or instead.

Thus it is to be understood that the system may cause the vehicle to accelerate to the second target speed value whilst actively managing the acceleration rate to maintain traction.

Optionally, the system may be configured wherein the second target speed value is a target speed value stored by the system.

Optionally, the second target speed value may be stored in a memory of the system.

The system may be configured to cause a powertrain to commence causing the vehicle to operate in accordance with the second target speed value in dependence on the driver drive demand signal when the driver demand signal corresponds to a greater drive torque than that required by the system to cause the vehicle to operate in accordance with the first target speed value.

It is to be understood that in some embodiments the speed control system may be configured to generate a virtual driver drive demand signal and to supply this signal to a powertrain controller, for example an engine controller. The instantaneous driver drive demand signal may correspond to the position of an accelerator pedal that is actuated by a driver. The virtual driver drive demand signal may correspond to a virtual accelerator pedal position. The control system may be configured to compare the instantaneous driver drive demand signal with the virtual driver drive demand signal, and cause the vehicle to operate in accordance with the second target speed value in dependence on whether the instantaneous driver drive demand signal corresponds to a greater amount of torque than the virtual driver drive demand signal. The speed control system may calculate the second target speed value in dependence on the instantaneous driver drive demand signal when the instantaneous driver drive demand signal exceeds the virtual driver drive demand signal.

The system may be configured to calculate a rate of acceleration of a vehicle that would be expected according to the instantaneous driver drive demand signal when not operating in a speed control mode, and to calculate the second target speed value in dependence on the expected rate of acceleration.

Thus, the system may calculate a value of acceleration of the vehicle in dependence on the instantaneous driver demand signal. The value of acceleration may be that which would be experienced if the speed control system was not causing the vehicle to operate in accordance with a target speed value, for example if the vehicle control system was in the first mode and the instantaneous driver drive demand signal was controlling directly the amount of drive torque applied to one or more wheels by a powertrain without the speed control system acting to control powertrain torque.

Optionally, the second target speed value corresponds to an integrated value of the expected rate of acceleration of a vehicle according to the prevailing instantaneous driver drive demand signal.

Optionally, the system may be configured to recalculate the second target speed value substantially continuously.

Optionally, the system may be configured to recalculate the second target speed value substantially continuously when the instantaneous driver drive demand signal corresponds to an amount of drive torque that is greater than an amount of drive torque required by the system to cause the vehicle to operate in accordance with the first target speed value.

Optionally, the system may be configured to cause the second target speed value gradually to become equal to the first target speed value when the driver demand signal corresponds to an amount of drive torque substantially equal to or less than that required by the system to cause the vehicle to operate in accordance with the first target speed value.

This feature has the advantage that the system may smoothly accommodate changes in target speed value due to changes in the value of driver drive demand signal when the control system is operating in the second mode.

Optionally, the system may be configured to cause the second target speed value gradually to become equal to the first target speed value when the driver demand signal indicates a driver is demanding substantially no drive torque.

Optionally, the system may be configured to cause the second target speed value gradually to become equal to the first target speed value by blending the first and second target speed values over time when the driver demand signal corresponds to an amount of drive torque substantially equal to or less than that required by the system to cause the vehicle to operate in accordance with the first target speed value.

Optionally, the system may be configured to cause a vehicle to operate in accordance with a target speed value by causing a vehicle to travel at a speed substantially equal to the target speed value.

Optionally, the system may be configured to allow a user to input a target speed value, the system being configured to set the first target speed value equal to the target speed value input by the user.

Optionally, the system may be configured to set the first target speed value to a value lower than the target speed value input by the user in dependence on one or more parameters.

Optionally, the system may be configured to set the first target speed value to a value lower than the target speed value input by the user in dependence on one or more parameters the parameters being selected from amongst one or more parameters indicative of movement of at least a portion of a body of a vehicle, one or more parameters indicative of movement of at least a portion of a body of an occupant, and one or more parameters indicative of the nature of terrain over which a vehicle is driving.

The one or more parameters indicative of movement of at least a portion of a body of a vehicle may include lateral, longitudinal and or vertical acceleration. Other parameters may also be useful in addition or instead. The system may be configured to reduce the first target speed value to a value lower than the value input by the user so as to enhance vehicle composure and user enjoyment of a vehicle when travelling over relatively rough terrain.

The nature of the terrain over which the vehicle is driving may be determined by reference to a user input indicative of terrain such as a user operable terrain response (TR) mode selector or a signal indicative of a terrain response mode selected automatically by a controller. It is to be understood that vehicles with user selectable TR (RTM) modes are known and more recently vehicle with automatic TR mode selection functionality have become known.

Optionally, the speed control system comprises a speed controller configured to receive the driver drive demand signal and cause the vehicle to operate in accordance with the second target speed value greater than the first in dependence at least in part on the driver drive demand signal.

Optionally, the first controller is hosted by an anti-lock braking system (ABS) controller.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors as the controller. Other arrangements are also useful.

In a further aspect of the invention for which protection is sought there is provided a vehicle comprising a body, a plurality of wheels, a powertrain to drive said wheels, a braking system to brake said wheels, and a system according to another aspect.

In an aspect of the invention for which protection is sought there is provided a method of controlling a vehicle comprising:

causing the vehicle to operate in accordance with a first target speed value stored by the system at least in part by controlling automatically an amount of drive torque applied to one or more wheels by a powertrain;

receiving an instantaneous driver drive demand signal in response to a prevailing driver displacement of an accelerator pedal;

determining a second target speed value greater than the first target speed value in dependence on the instantaneous driver drive demand signal; and causing automatic acceleration of the vehicle from the first target speed value to the second target speed value at a rate not exceeding a maximum acceleration.

The method may comprise causing the vehicle to accelerate from the first target speed value to the second target speed value according to a predetermined speed or acceleration profile.

The method may comprise determining the speed or acceleration profile in dependence on at least one vehicle parameter.

The method may comprise determining the speed or acceleration profile in dependence on the identity of the driving mode, selected from a plurality of driving modes, in which the vehicle is operating.

The method may comprise receiving a signal indicative of the driving mode in which a user requires the vehicle to operate.

The method may comprise receiving a signal indicative of the driving mode in which a user requires the vehicle to operate by means of a user-operable driving mode control.

The method may comprise selecting automatically a driving mode appropriate to a driving surface over which a vehicle is driving when the vehicle is operated in an automatic driving mode selection mode.

Optionally the driving modes are control modes of at least one subsystem of a vehicle selected from amongst an engine management system, a transmission system, a steering system, a brakes system and a suspension system, the method comprising causing a subsystem controller to control one or more vehicle subsystems in the selected one of the plurality of subsystem control modes, each of the subsystem control modes corresponding to one or more different driving surfaces.

The method may comprise determining the maximum rate of acceleration of the vehicle in dependence at least in part on the first and second target speed values, the method comprising limiting the rate of acceleration according to the maximum rate.

The method may comprise monitoring slip of one or more wheels of the vehicle whilst causing automatic acceleration of the vehicle from the first target speed value to the second target speed value, and reducing a net torque applied to one or more wheels in dependence on the amount of slip of one or more wheels thereby to reduce slip when slip exceeds a predetermined amount, or controlling net torque applied to one or more wheels in dependence on the amount of slip of one or more wheels thereby to prevent slip from exceeding a predetermined amount.

Optionally, the method may comprise setting the first target speed value to a value input by a user.

In one aspect of the invention for which protection is sought there is provided a system comprising a speed control system configured automatically to cause a vehicle to operate in accordance with a first target speed value stored by the system at least in part by controlling an amount of drive torque applied to one or more wheels by a powertrain, the system being configured to receive a driver drive demand signal indicative of an amount of driver demanded drive torque to be applied to one or more wheels, the system being configured to cause the vehicle to operate in accordance with a second target speed value greater than the first in dependence at least in part on the driver drive demand signal.

The second target speed value may also be a target speed value stored by the system, for example in a memory of the system.

Optionally the system is configured to cause a powertrain to commence causing the vehicle to operate in accordance with the second target speed value in dependence on the driver drive demand signal when the driver demand signal corresponds to a greater drive torque than that required by the system to cause the vehicle to operate in accordance with the first target speed value.

Optionally the system is configured to calculate an expected rate of acceleration of a vehicle according to the prevailing driver drive demand and to calculate the second target speed value in dependence on the expected rate of acceleration.

Thus, the system calculates a value of acceleration of the vehicle in dependence on the driver demand signal. The value of acceleration may be that which would be experienced if the speed control system were not causing the vehicle to operate in accordance with a target speed value, and the driver drive demand signal was controlling directly the amount of drive torque applied to one or more wheels by a powertrain.

Optionally the second target speed value corresponds to an integrated value of the expected rate of acceleration of a vehicle according to the prevailing driver drive demand signal.

Optionally the system is configured to recalculate the second target speed value substantially continuously.

In a further aspect of the invention for which protection is sought there is provided a method of operating a vehicle implemented by means of a control system comprising:

automatically causing a vehicle to operate in accordance with a first target speed value stored by the system at least in part by controlling an amount of drive torque applied to one or more wheels by a powertrain;

receiving a driver drive demand signal indicative of an amount of driver demanded drive torque to be applied to one or more wheels; and causing the vehicle to operate in accordance with a second target speed value greater than the first in dependence at least in part on the driver drive demand signal.

In one aspect of the invention for which protection is sought there is provided a carrier medium carrying computer readable code for controlling a vehicle to carry out the method of another aspect.

In one aspect of the invention for which protection is sought there is provided a computer program product executable on a processor so as to implement the method of another aspect.

In one aspect of the invention for which protection is sought there is provided a computer readable medium loaded with the computer program product of another aspect.

In one aspect of the invention for which protection is sought there is provided a processor arranged to implement the method of another aspect.

In one aspect of the invention for which protection is sought there is provided a motor vehicle control system comprising a speed control system, the system being operable in one of at least a first mode and a second mode, wherein in the first mode the speed control system does not control vehicle speed and an amount of drive torque applied to one or more wheels by a powertrain is controlled at least in part by reference to a driver drive demand signal indicative of an amount of driver demanded drive torque to be applied to one or more wheels, and in the second mode the speed control system is configured automatically to cause a vehicle to operate in accordance with a first target speed value stored by the system at least in part by controlling automatically an amount of drive torque applied to one or more wheels by a powertrain, the speed control system being configured to receive the driver drive demand signal and to cause the vehicle to operate in accordance with a second target speed value greater than the first in dependence at least in part on the driver drive demand signal.

The second target speed value may also be a target speed value stored by the system, for example in a memory of the system.

The system may be configured when in the second mode to cause a powertrain to commence causing the vehicle to operate in accordance with the second target speed value in dependence on the driver drive demand signal when the driver demand signal corresponds to a greater drive torque than that required by the system to cause the vehicle to operate in accordance with the first target speed value.

In an aspect of the invention for which protection is sought there is provided a method of operating a vehicle implemented by means of a control system comprising:

in a first mode of operation of the control system, controlling an amount of drive torque applied to one or more wheels by a powertrain at least in part by reference to a driver drive demand signal indicative of an amount of driver demanded drive torque to be applied to one or more wheels; and in a second mode of operation of the control system, automatically causing a vehicle to operate in accordance with a first target speed value stored by the system at least in part by controlling automatically an amount of drive torque applied to one or more wheels by a powertrain, the method comprising, when in the second mode, causing the vehicle to operate in accordance with a second target speed value greater than the first in dependence at least in part on the driver drive demand signal.

The method may comprise setting the first target speed value to a value input by a user.

In one aspect of the invention for which protection is sought there is provided a system comprising a speed control system configured automatically to cause a vehicle to operate in accordance with a first target speed value stored by the system at least in part by controlling an amount of drive torque applied to one or more wheels by a powertrain, the system being configured to receive a driver drive demand signal indicative of an amount of driver demanded drive torque to be applied to one or more wheels, the system being configured to cause the vehicle to operate in accordance with a second target speed value greater than the first in dependence at least in part on the driver drive demand signal Other arrangements may also be useful.

In one aspect of the invention for which protection is sought there is provided a motor vehicle comprising a system according to another aspect.

In one aspect of the invention for which protection is sought there is provided a vehicle comprising a chassis, a body attached to said chassis, a plurality of wheels, a powertrain to drive said wheels, a braking system to brake said wheels, and a system according to another aspect.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
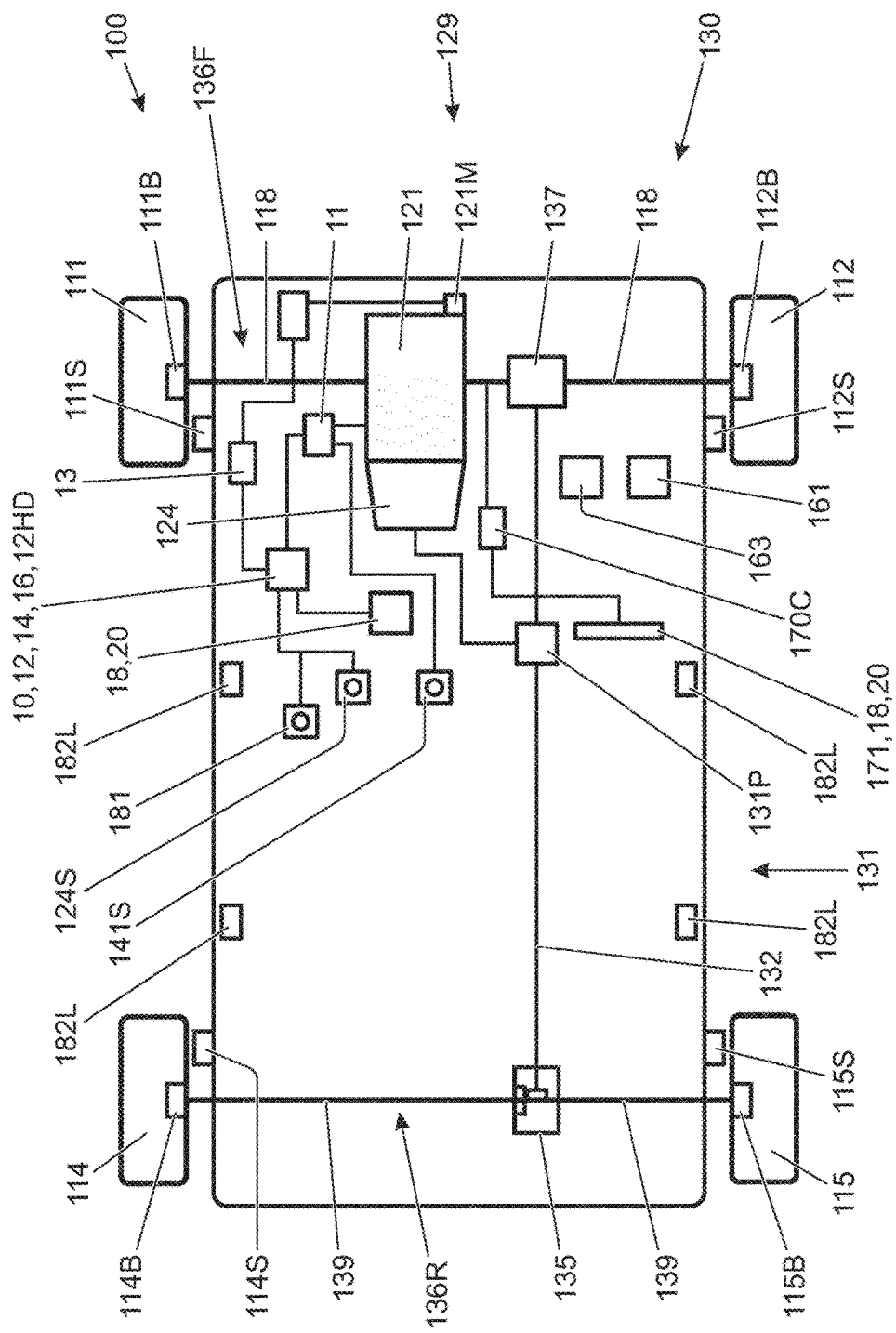
FIG. 1 is a schematic illustration of a vehicle according to an embodiment of the invention in plan view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode P, a reverse mode R, a neutral mode N, a drive mode D or a sport mode S, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The front wheels 111, 112 in combination with the front drive shafts 118 and front differential 137 may be referred to as a front axle 136F. The rear wheels 114, 115 in combination with rear drive shafts 139 and rear differential 135 may be referred to as a rear axle 136R.

The wheels 111, 112, 114, 115 each have a respective brake 111B, 112B, 114B, 115B. Respective speed sensors 111S, 112S, 114S, 115S are associated with each wheel 111, 112, 114, 115 of the vehicle 100. The sensors 111S, 112S, 114S, 115S are mounted to a chassis 100C of the vehicle 100 and arranged to measure a speed of the corresponding wheel.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
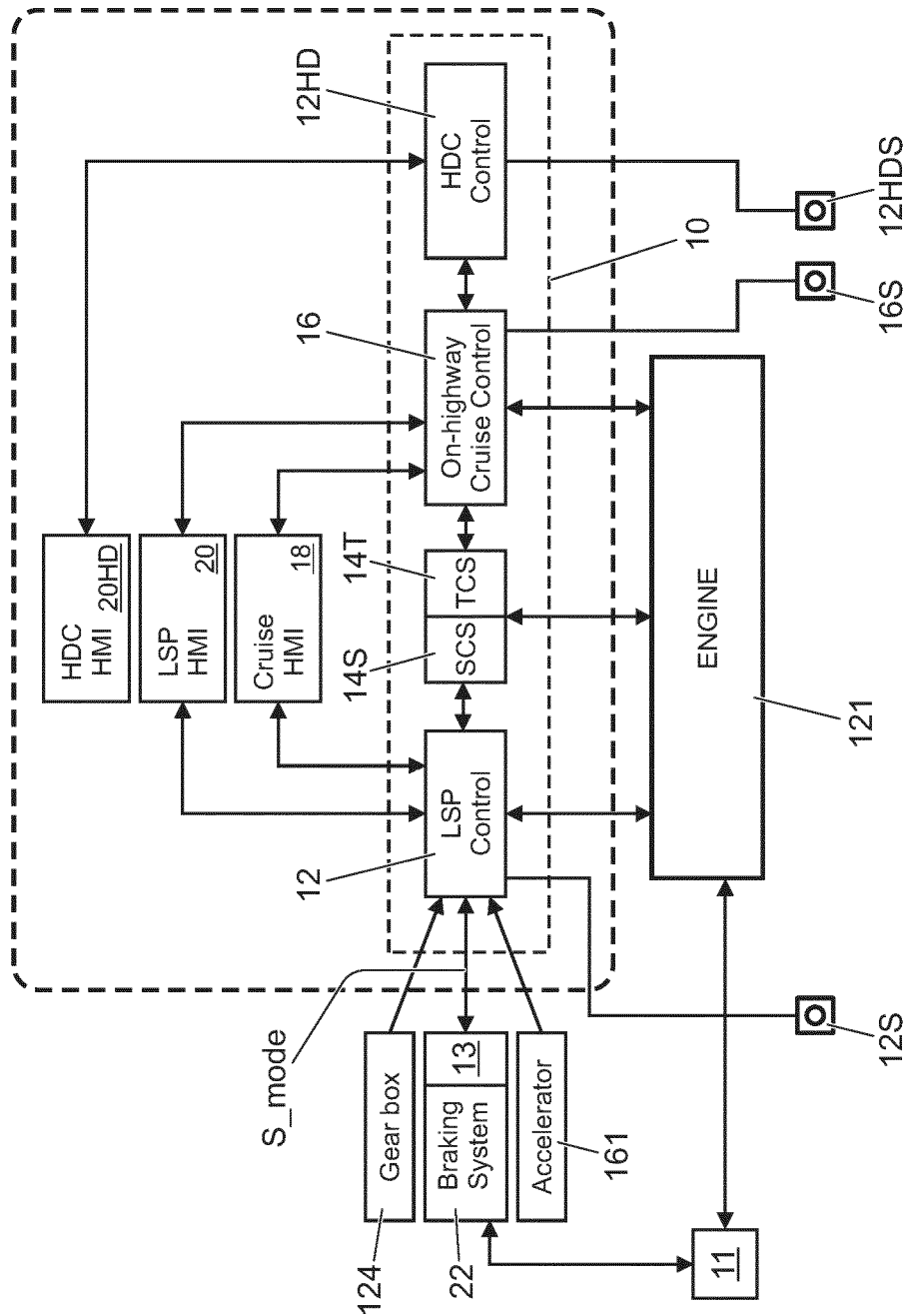
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, the powertrain controller 11, a brake controller 13 and a steering controller 170C. The brake controller 13 is an anti-lock braking system (ABS) controller 13 and forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3, a stability control system (SCS) 14S, a traction control system (TCS) 14T, a cruise control system 16 and a Hill Descent Control (HDC) system 12HD. The SCS 14S improves stability of the vehicle 100 by detecting and managing loss of traction when cornering. When a reduction in steering control is detected, the SCS 14S is configured automatically to command a brake controller 13 to apply one or more brakes 111B, 112B, 114B, 115B of the vehicle 100 to help to steer the vehicle 100 in the direction the user wishes to travel. In some embodiments, in addition or instead the SCS 14S may reduce powertrain torque to one or more wheels. If excessive wheel spin is detected, the TCS 14T is configured to reduce wheel spin by application of brake force in combination with a reduction in powertrain drive torque. In some embodiments, in addition or instead the TCS 14T may cause application of brake force without reducing powertrain drive torque. In the embodiment shown the SCS 14S and TCS 14T are implemented by the VCU 10. In some alternative embodiments the SCS 14S and/or TCS 14T may be implemented by the brake controller 13. Further alternatively, the SCS 14S and/or TCS 14T may be implemented by separate controllers.

Similarly, one or more of the controllers 10, 11, 13, 170C may be implemented in software run on a respective one or more computing devices such as one or more electronic control units (ECUs). In some embodiments two or more controllers may be implemented in software run on one or more common computing devices. Two or more controllers may be implemented in software in the form of a combined software module, or a plurality of respective modules each implementing only one controller.

One or more computing devices may be configured to permit a plurality of software modules to be run on the same computing device without interference between the modules. For example the computing devices may be configured to allow the modules to run such that if execution of software code embodying one module terminates erroneously, or the computing device enters an unintended endless loop in respect of one of the modules, it does not affect execution by one or more computing devices of software code comprised by a software module embodying the second controller.

It is to be understood that one or more of the controllers 10, 11, 13, 170C may be configured to have substantially no single point failure modes, i.e. one or more of the controllers may have dual or multiple redundancy. It is to be understood that robust partitioning technologies are known for enabling redundancy to be introduced, such as technologies enabling isolation of software modules being executed on a common computing device. It is to be understood that the common computing device will typically comprise at least one microprocessor, optionally a plurality of processors, which may operate in parallel with one another. In some embodiments a monitor may be provided, the monitor being optionally implemented in software code and configured to raise an alert in the event a software module is determined to have malfunctioned.

The SCS 14S, TCS 14T, ABS controller 22C and HDC system 12HD provide outputs indicative of, for example, SCS activity, TCS activity and ABS activity including brake interventions on individual wheels and engine torque requests from the VCU 10 to the engine 121, for example in the event a wheel slip event occurs. Each of the aforementioned events indicate that a wheel slip event has occurred. Other vehicle sub-systems such as a roll stability control system or the like may also be present.

Figure 5:
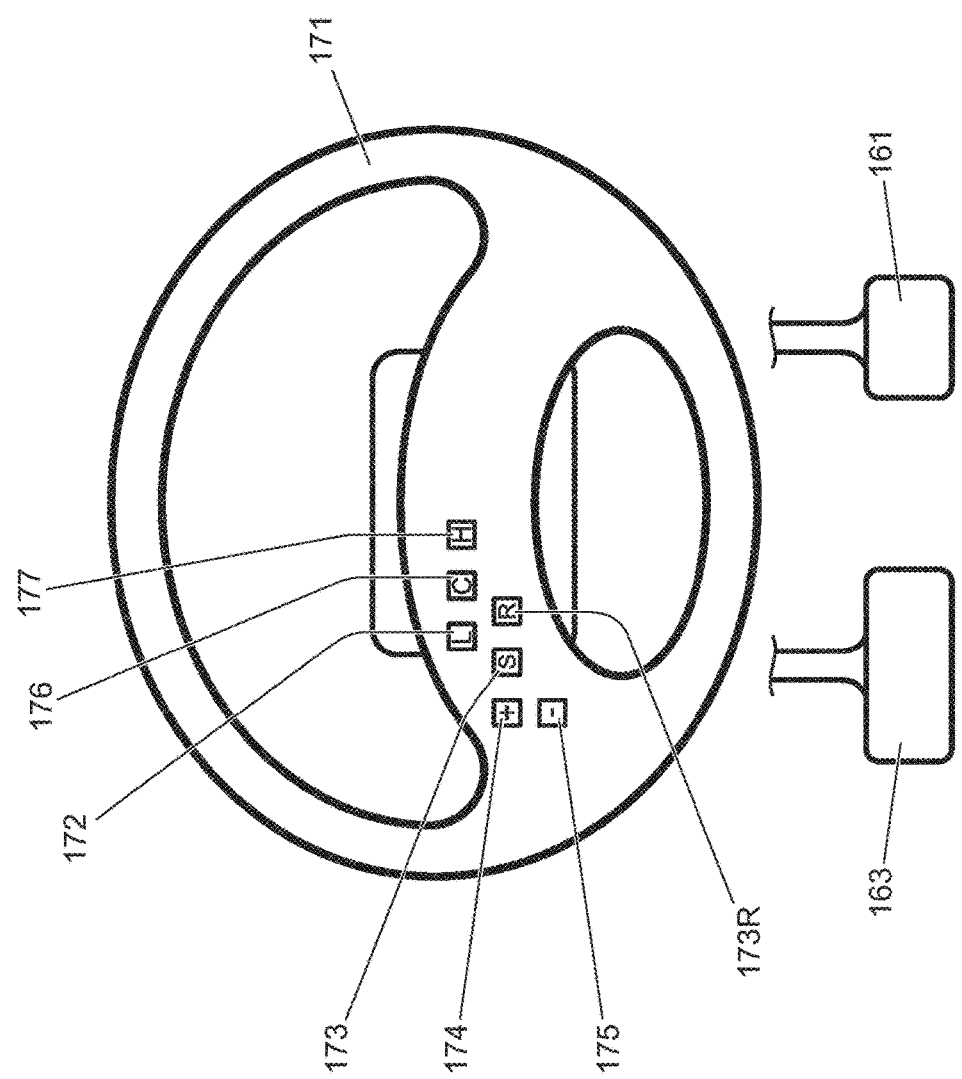
FIG. 5 illustrates a steering wheel and brake and accelerator pedals of a vehicle according to an embodiment of the present invention.

As noted above the vehicle 100 includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed. It is to be understood that in some embodiments the LSP control system selector button 172 may be mounted in a location other than on the steering wheel 171, such as in a dashboard or any other suitable location.

The LSP control system 12 is configured to allow a user to input a desired value of set-speed parameter, user_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of user_set-speed by setting a parameter LSP_set-speed equal to the value of user_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behavior when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC system 12HD is configured to limit vehicle speed when descending a gradient. When the HDC system 12HD is active, the system 12HD controls the braking system 22 (via brake controller 13) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system 12HD is active, the HDC system 12HD controls the braking system 22 to prevent vehicle speed from exceeding the value of HDC_set-speed. In the present embodiment the HDC system 12HD is not operable to apply positive drive torque. Rather, the HDC system 12HD is only operable to apply negative brake torque by means of the braking system 22.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system 12, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode as discussed in further detail below. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate although as noted elsewhere the HDC system 12HD is not able to cause positive drive torque to be applied by the powertrain 129 in order to reduce a rate of deceleration of the vehicle 100. The rate is set at 1.25 ms-2 in the present embodiment, however other values are also useful. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored.

In the present embodiment the vehicle 100 is configured to assume one of a plurality of power modes PM at a given moment in time. In each power mode the vehicle 100 may be operable to allow a predetermined set of one or more operations to be performed. For example, the vehicle 100 may allow a predetermined one or more vehicle subsystems such as an infotainment system, a windscreen demist subsystem and a windscreen wiper control system to be activated only in a respective one or more predetermined power modes. In one or more of the power modes the vehicle 100 may be configured to inhibit one or more operations, such as turning on of the infotainment system.

The identity of the power mode in which the vehicle 100 is to operate at a given moment in time is transmitted to each controller 10, 11, 12, 13, 14, 16, 12HD, of the vehicle 100 by the central controller 10. The controllers respond by assuming a predetermined state associated with that power mode and that controller. In the present embodiment each controller may assume an ON state in which the controller is configured to execute computer program code associated with that controller, and an OFF state in which supply of power to the controller is terminated. In the present embodiment, the central controller 10 is also operable to assume a quiescent state. The quiescent state is assumed by the central controller 10 when the vehicle is in power mode PM0 and the controller 10 has confirmed that the other controllers 11, 12, 13, 14, 16, 12HD have successfully assumed the OFF state following receipt of the command to assume power mode PM0.

Figure 2:
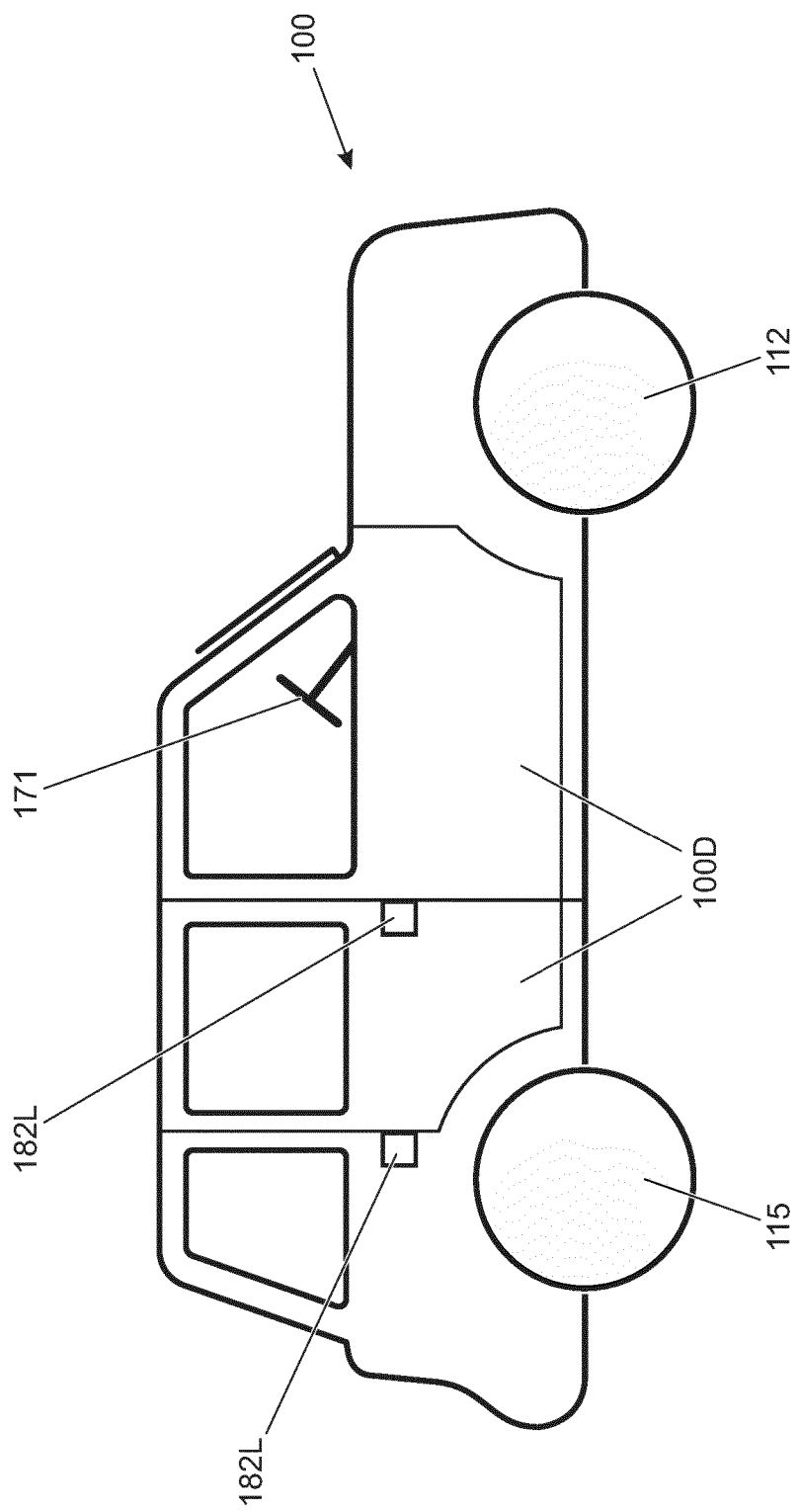
FIG. 2 shows the vehicle of FIG. 1 in side view.
Figure 6:
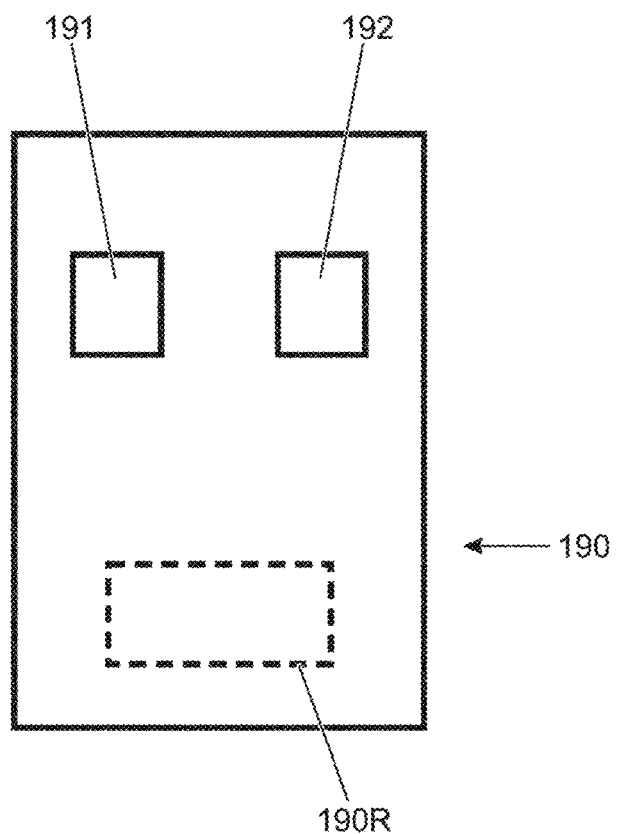
FIG. 6 is a schematic illustration of a known key fob for use with the vehicle of FIG. 1.

In the present embodiment the vehicle 100 is provided with a known key fob 190 (FIG. 6) that has a radio frequency identification device (RFID) 190R embedded therein. The key fob 190 has first and second control buttons 191, 192. The key fob 100 is configured to generate a respective electromagnetic signal in response to depression of the first or second control buttons 191, 192. The central controller 10 detects the electromagnetic signal by means of a receiver module forming part of the controller 10 and triggers locking or unlocking of door locks 182L of the vehicle 100. Each door 100D of the vehicle 100 is provided with a respective door lock 182L as shown in FIG. 2.

Pressing of the first control button 191 generates a door unlock signal, which triggers unlocking of the door locks 182L, whilst pressing of the second control button 192 triggers a door lock signal, which triggers locking of the door locks 182L.

When the controller 10 is in the quiescent state, consumption of power by the central controller 10 is reduced and the controller 10 monitors receipt of a door unlock signal from the key fob 190. It is to be understood that in some embodiments one or more vehicle controllers may be configured to remain in the ON or quiescent state, to allow one or more essential functions to be performed, when the vehicle is in power mode PM0. For example in vehicles fitted with an intruder alarm system an intruder alarm controller may be permitted to remain in the ON or a quiescent state pending detection of an intrusion. Upon detection of an intrusion the intruder alarm controller may cause the central controller 10 to assume the ON state if it is not already in that state.

The central controller 10 is also configured to transmit a radio frequency (RF) 'interrogation' signal that causes the RFID device 190R of the key fob 190 to generate an RF 'acknowledgement' signal in response to receipt of the interrogation signal. In the present embodiment the RFID device 190R is a passive device, not requiring battery power in order to generate the acknowledgement signal. The controller 10 is configured to detect the acknowledgment signal transmitted by the RFID device 190R provided the RFID device 190R is within range. By the term 'within range' is meant that the RFID device 190R or fob 190 is sufficiently close to the controller 10 to receive the interrogation signal and generate an acknowledgement signal that is detectable by the controller 10.

The vehicle 100 is also provided with a start/stop button 181. The start/stop button 181 is configured to transmit a signal to the central controller 10 when pressed in order to trigger an engine start operation, provided certain predetermined conditions are met. In response to pressing of the start/stop button 181 the central controller 10 causes the vehicle 100 to be placed in a condition in which if the transmission 124 is subsequently placed in the forward operating mode D or reverse operating mode R, the vehicle 100 may be driven by depressing accelerator pedal 161. In the present embodiment, the central controller 10 is configured to perform a pre-start verification operation before commanding the powertrain controller 11 to trigger an engine start operation. In performing the pre-start verification operation the controller 10 verifies (a) that the vehicle 100 is in a predetermined power mode as described in more detail below, (b) that the controller 10 is receiving an acknowledgement signal from the key fob 190 in response to transmission of the interrogation signal by the controller 10, and (c) that the transmission 124 is in either the park P or neutral N modes. Thus, the controller 10 requires that the RFID device 190R is within range of the controller 10 before permitting an engine start. If any of conditions (a) to (c) are not met the controller causes the vehicle 100 to remain in its current power mode.

It is to be understood that the central controller 10 is configured to cause the vehicle 100 to assume a predetermined one of a plurality of power modes in dependence at least in part on actuation of a control button 191, 192 of the key fob 190 and actuation of the start/stop button 181. In some embodiments the vehicle 100 may be configured such that the central controller 10 responds to voice commands from a user in addition to or instead of signals received from the key fob 190.

The various power modes in which the vehicle 100 of the embodiment of FIG. 1 may be operated will now be described. As noted above, the key fob 190 is operable to cause the door locks 182L of the vehicle 100 to be locked and unlocked. When the doors 100D of the vehicle 100 (FIG. 2) are closed and the locks 182L are in the locked condition, the vehicle 100 assumes power mode PM0.

If the first button 191 of the key fob 190 is subsequently actuated, the controller 10 causes the door locks 182L to assume the unlocked condition. Once the door locks 182L are in the unlocked condition and the controller 10 detects the acknowledgement signal from the key fob 190, the controller 10 causes the vehicle 100 to assume power mode PM4. In power mode PM4 the controller 10 permits a predetermined number of electrical systems to become active, including an infotainment system. Power mode PM4 may also be referred to as a convenience mode or accessory mode. If a user subsequently presses the second button 192 of the key fob 190, the controller 10 causes the vehicle 100 to revert to power mode PM0.

If, whilst the vehicle is in power mode PM4 a user presses the starter button 181 and maintains the button 181 in a depressed condition, the controller 10 performs the pre-start verification operation described above. Provided conditions (a) to (c) of the pre-start verification operation are met, the controller 10 places the vehicle 100 in power mode PM6. When the vehicle 100 is in power mode PM6 the powertrain controller 11 is permitted to activate a starter device. In the present embodiment the starter device is a starter motor 121M. The powertrain controller 11 is then commanded to perform an engine start operation in which the engine 121 is cranked by means of the starter motor 121M to cause the engine 121 to start. Once the controller 10 determines that the engine 121 is running, the controller 10 places the vehicle 100 in power mode PM7.

In power mode PM6 the controller 10 disables certain non-critical electrical systems including the infotainment system. This is at least in part so as to reduce the magnitude of the electrical load on a battery 100B of the vehicle during cranking in order to permit an increase in the amount of electrical current available for engine starting. Isolation of non-critical electrical systems also reduces a risk of damage to the systems when a relatively large current drain is placed on the battery 100B by the starter motor 121M.

If whilst the vehicle is in power mode PM7, with the engine 121 running, a user again actuates the start/stop button 181, the controller 10 causes the powertrain controller 11 to switch off the engine 121 and the controller 10 causes the vehicle 100 to transition to power mode PM4. A user may then cause the vehicle to assume power mode PM0 by pressing the first button 191 of the key fob 190 provided each of the doors 100D is closed. It is to be understood that in some embodiments the user may trigger assumption of power mode PM0 whilst remaining in the vehicle 100 and locking the doors 181 by means of the key fob 190. In some embodiments the vehicle 100 may be configured to assume power mode PM0 regardless of whether the controller is receiving the acknowledgement signal from the key fob 190. Other arrangements are also useful.

It is to be understood that assumption of power mode PM0 by the vehicle 100 may be referred to as 'key off', whilst assumption of power mode PM4 from power mode PM0 may be referred to as 'key on'. A sequence of transitions of the vehicle from power mode PM0 to PM4, and back to power mode PM0, optionally including one or more transitions to power mode PM6 and power mode PM7 prior to assumption of power mode PM0, may be referred to as a 'key cycle'. Thus a key cycle begins and ends with the vehicle 100 in power mode PM0. In some embodiments, assumption of power mode PM6 or PM7 from power mode PM0 may be required in order to complete a key cycle, starting with power mode PM0.

It is to be understood that the VCU 10 is configured to implement a known Terrain Response (TR) (RTM) System of the kind described above in which the VCU 10 controls settings of one or more vehicle systems or sub-systems such as the powertrain controller 11 in dependence on a selected driving mode. The driving mode in which the VCU 10 causing the one or more systems or sub-systems to operate is indicated by a parameter driving_mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In the present embodiment, at any given moment in time the LSP control system 12 is in one of a plurality of allowable 'on' modes (also referred to as conditions or states) selected from amongst an active or full function (FF) mode, a descent control (DC) mode, also referred to as an intermediate mode and a standby mode. The LSP control system may also assume an 'off' mode or condition. The active mode, DC mode and standby mode may be considered to be different 'on' modes or conditions of the vehicle, i.e. different modes in which the LSP control system is in an 'on' mode or condition as opposed to an 'off' mode or condition. In the off condition the LSP control system 12 only responds to pressing of the LSP selector button 172, which causes the LSP control system 12 to assume the on condition and the DC mode. When the LSP control system 12 assumes the on mode from the off mode in response to pressing of the LSP selector button, the value of user_set-speed is set to the instant speed of the vehicle 100 provided it is in the allowable range of speeds for operation of the LSP control system 12. If the vehicle speed 100 is above this range the value of user_set-speed is set to the highest allowable speed for operation of the LSP control system 12, i.e. 30 kph.

In the active or full function mode, the LSP control system 12 actively manages vehicle speed in accordance with the value of LSP set-speed, LSP_set-speed, by causing the application of positive powertrain drive torque to one or more driving wheels or negative braking system torque to one or more braked wheels.

In the DC mode the LSP control system 12 operates in a similar manner to that in which it operates when in the active mode except that the LSP control system 12 is prevented from commanding the application of positive drive torque by means of the powertrain 129. Rather, only braking torque may be applied, by means of the braking system 22 and/or powertrain 129. The LSP control system 12 is configured to increase or decrease the amount of brake torque applied to one or more wheels in order to cause the vehicle to maintain the LSP set-speed to the extent possible without application of positive drive torque. It is to be understood that, in the present embodiment, operation of the LSP control system 12 in the DC mode is very similar to operation of the HDC system 12HD, except that the LSP control system 12 continues to employ the LSP control system 12 set-speed value LSP_set-speed rather than the HDC control system set-speed value HDC_set-speed.

In the standby mode, the LSP control system 12 is unable to cause application of positive drive torque or negative brake torque to a wheel.

As noted above, in the 'off' mode the LSP control system 12 is not responsive to any LSP input controls except the LSP control system selector button 172. Pressing of the LSP control system selector button 172 when the system 12 is in the off mode causes the system 12 to assume the 'on' condition and the DC mode. The value of LSP_set-speed is set to the instant speed of the vehicle 100 provided it is in the allowable range of speeds for operation of the LSP control system 12. If the vehicle speed 100 is above this range the value of LSP_set-speed is set to the highest allowable speed for operation of the LSP control system 12, i.e. 30 kph.

If whilst in DC mode the 'set+' button 174 is pressed, the LSP control system 12 sets the value of user_set-speed to the instant value of vehicle speed according to vehicle speed signal 36 (FIG. 4, discussed in more detail below) and assumes the active mode. If the vehicle speed is above 30 kph, being the maximum allowable value of user_set-speed and LSP_set-speed, the LSP control system 12 remains in the DC mode and ignores the request to assume the active mode. A signal may be provided to the driver indicating that the LSP control system 12 cannot be activated due to the vehicle speed exceeding the maximum allowable value of LSP_set-speed. The signal may be provided by means of a text message provided on the LSP control HMI 18, by means of an indicator lamp, an audible alert or any other suitable means.

If the resume button 173R is depressed whilst in the DC mode, the LSP control system assumes the active mode and causes the vehicle to operate in accordance with the stored value of user_set-speed, i.e. LSP_set-speed is set to the stored value of user_set-speed unless a lower value of LSP_set-speed is required, provided the vehicle speed does not exceed 30 kph. The manner in which lower values of LSP_set-speed may be set is discussed in more detail below with respect to FIG. 7.

If vehicle speed is above 30 kph but less than or substantially equal to 50 kph when the resume button 173R is pressed the LSP control system 12 remains in the DC mode until vehicle speed falls below 30 kph. In the DC mode, provided the driver does not depress the accelerator pedal 161 the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active mode in which it is operable to cause a required amount of positive powertrain drive torque to be applied to one or more wheels via the powertrain 129, as well as negative torque via the powertrain 129 (via engine braking) and brake torque via the braking system 22 in order to control the vehicle in accordance with the LSP_set-speed value. The LSP control system 12 may generate a virtual accelerator pedal signal in order to cause the powertrain 129 to develop a required amount of powertrain torque in some embodiments. The virtual accelerator pedal signal may correspond to that which would be generated by an accelerator pedal controller in response to depression of the accelerator pedal 161 by an amount corresponding to the amount of powertrain torque required at a given moment in time. The accelerator pedal controller may form part of a powertrain controller 11 although other arrangements are also useful.

With the LSP control system 12 in the active mode, the user may increase or decrease the value of user_set-speed by means of the '+' and '−' buttons 174, 175. In addition, the user may optionally also increase or decrease the value of user_set-speed by lightly pressing the accelerator or brake pedals 161, 163 respectively. In some embodiments, with the LSP control system 12 in the active mode the '+' and '−' buttons 174, 175 may be disabled such that adjustment of the value of user_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful, such as 30-120 kph or any other suitable range of values.

It is to be understood that if the LSP control system 12 is in the active mode, operation of the cruise control system 16 is inhibited. The two speed control systems 12, 16 therefore operate independently of one another, so that only one can be operable at any one time.

In some embodiments, the cruise control HMI 18 and the LSP control HMI 20 may be configured within the same hardware so that, for example, the speed selection is input via the same hardware, with one or more separate switches being provided to switch between the LSP control HMI 20 and the cruise control HMI 18.

When in the active mode, the LSP control system 12 is configured to command application of positive powertrain torque and negative brake torque, as required, by transmitting a request for (positive) drive torque in the form of a powertrain torque signal and/or a request for (negative) brake torque in the form of a brake torque signal to the brake controller 13. The brake controller 13 arbitrates any demand for positive powertrain torque, determining whether the request for positive powertrain torque is allowable. If a request for positive powertrain torque is allowable the brake controller 13 issues the request to the powertrain controller 11. In some embodiments, the request for brake torque may correspond to an amount of brake torque (or brake fluid pressure) to be developed by the braking system 22. In some alternative embodiments the request for brake torque may be for an amount of negative torque to be applied to one or more wheels. The brake controller 13 may in some embodiments determine whether the requested negative torque is to be supplied by means of powertrain braking alone, for example engine overrun braking, by means of powertrain braking and brake torque developed by the braking system 22, or by means of the braking system 22 alone. In some embodiments the brake controller 13 or LSP control system 12 may be configured to cause a required amount of net negative torque to be applied to one or more wheels by applying negative torque by means of the braking system 22 against positive drive torque generated by the powertrain 129. Application of positive drive torque generated by means of the powertrain 129 against negative brake torque generated by means of the braking system 22 may be made in order to reduce wheel flare when driving on surfaces of relatively low surface coefficient of friction such as during off-road driving. By wheel flare is meant excessive wheel slip as a result of the application of excess positive net torque to a wheel.

In the present embodiment the brake controller 13 also receives from the LSP control system 12 a signal S_mode indicative of the mode in which the LSP control system 12 is operating, i.e. whether the LSP control system 12 is operating in the active mode, DC mode, standby mode or off mode.

If the brake controller 13 receives a signal S_mode indicating that the LSP control system 12 is operating in the DC mode, standby mode or off mode, the brake controller 13 sets a powertrain torque request inhibit flag in a memory thereof. The powertrain torque request inhibit flag indicates that positive torque requests to the powertrain controller 11 from the brake controller 13 in response to positive torque requests from the LSP control system 12 are forbidden. Accordingly, if a request for positive powertrain torque is received by the brake controller 13 from the LSP control system 12 whilst the LSP control system 12 is operating in the DC mode, standby mode or off mode, the positive torque request is ignored by the brake controller 13.

In some embodiments, the powertrain controller 11 is also provided with signal S_mode indicating the mode in which the LSP control system 12 is operating. If the LSP control system 12 is operating in a mode other than the active mode, such as the DC mode, standby mode or off mode, positive powertrain torque requests received as a consequence of a command from the LSP control system 12 are ignored by the powertrain controller 11.

In some embodiments, if the powertrain controller 11 receives a request for positive powertrain torque from the brake controller 13 as a consequence of a command from the LSP control system 12 and the request is received more than a predetermined period after the LSP control system 12 has transitioned to a mode other than the active mode, the powertrain controller 11 causes the LSP control system 12 to assume a disabled off mode. In the disabled off mode the LSP control system 12 is effectively locked into the off condition or mode for the remainder of the current key cycle and the LSP control system 12 does not assume the DC mode in response to pressing of the LSP selector button 172. The predetermined period may be any suitable period such as 50 ms, 100 ms, 500 ms, 1000 ms or any other suitable period. The period may be set to a value such that any delay in receipt of a positive torque request issued by the LSP control system 12 immediately prior to a transition from the active mode to a mode other than the active mode (and in which positive torque requests are not permitted) that is consistent with normal system operation will not trigger a transition to the disabled off mode. However, the powertrain controller 11 is configured such that any request for positive powertrain torque received by the powertrain controller 11 as a consequence of a request issued by the LSP control system 12 after assuming a mode other than the active mode (and in which positive torque requests are not permitted) will trigger a transition to the disabled off mode.

It is to be understood that other arrangements may also be useful. For example, in some embodiments, in the disabled off mode the LSP control system 12 may be configured not to respond to the LSP selector button 172 by assuming the DC mode until after the vehicle has transitioned from power mode PM7 to power mode PM4. As described above, a transition from power mode PM7 to power mode PM4 may be accomplished by depressing the start/stop button 124S. When the vehicle 100 is subsequently restarted and assumes power mode PM7, the LSP control system 12 may be permitted to assume operation in the active mode as required.

It is to be understood that some vehicles may be provided with known automatic engine stop/start functionality. In vehicles with this functionality, the powertrain controller 11 is configured to command stopping and starting of the engine 121 according to a stop/start control methodology when the vehicle 100 is being held stationary by means of brake pedal 163 with the transmission in the drive mode D. The process of automatically commanding stopping and restarting of the engine 121 may be referred to as an automatic stop/start cycle. In vehicles having automatic engine stop/start functionality, the controller 10 may be configured to cause the vehicle 100 to assume a power mode PM6A when the engine 121 is stopped during a stop/start cycle. Power mode PM6A is similar to power mode 6, except that disabling of certain vehicle systems such as the infotainment system is not performed when in power mode PM6A. In power mode PM6A, the powertrain controller 11 is configured to restart the engine 121 upon receipt of a signal indicating a user has released the brake pedal 163. It is to be understood that in some embodiments, a vehicle 100 may be configured to require an engine restart before the LSP control system 12 may exit the DC fault mode but an engine restart as part of an automatic stop/start cycle may be configured not to qualify as an engine restart permitting the system 12 to exit the DC fault mode. In some embodiments therefore, a transition from power mode PM7 to power mode PM6A and back to power mode PM7 does not permit the LSP control system 12 to exit the disabled off mode.

In some embodiments the LSP control system 12 may be configured such that it can assume one of a number of different further modes such as:
(i) DC fault mode
(ii) DC fault mode fade-out mode
(iii) DC mode fade-out mode
(iv) Active standby mode
(v) DC standby mode The DC fault mode corresponds to the DC mode except that if the DC fault mode is assumed by the LSP control system 12, the LSP control system 12 is unable subsequently to assume the active mode for the remainder of the current key cycle. Thus, when the next key-on procedure is performed, following the next key-off procedure, the LSP control system 12 is permitted to assume the active mode when required. The vehicle 100 may be configured wherein the LSP control system 12 may assume the DC fault mode if a fault is detected indicating that the LSP control system 12 should not be permitted to request positive powertrain drive torque but where it is determined that it may be desirable for the benefits of DC mode to be enjoyed. Thus a transition from active mode to DC fault mode may be preferable to a transition to the off mode, particularly when negotiating off road conditions, in the event of a relatively minor fault in respect of the LSP control system 12.

In some embodiments, if a transition to DC fault mode occurs with more than a predetermined frequency, the LSP control system 12 may become latched in the DC fault mode until a reset procedure is performed requiring action other than a key-off and subsequent key-on procedure in order to permit the active mode to be assumed again. In some embodiments, the LSP control system 12 may require a predetermined code to be provided to it. In some embodiments, the LSP control system 12 may be configured to receive the code via a computing device external to the vehicle 100 that temporarily communicates with the LSP control system 12 in order to provide the code. The computing device may be a device maintained by a vehicle servicing organization such as a dealer certified by a manufacturer of the vehicle 100. The computing device may be in the form of a laptop or other computing device, and be configured to communicate wirelessly with the LSP control system 12 or via a wired connection.

The predetermined frequency may be defined in terms of a predetermined number of occurrences in a predetermined number of key cycles, or a predetermined distance driven, or be time based such as a predetermined number of occurrences in a predetermined period in which the vehicle is in power mode 7 (or power mode 6A in addition to power mode 7, in the case of a vehicle with stop/start functionality) over one or more key cycles, or a predetermined number of occurrences in a given calendar period, such as a day, a week, a month or any other suitable frequency.

The DC fault mode fade-out mode is a mode assumed by the LSP control system 12 when transitioning from the DC fault mode to an off mode such as disabled off, unless an immediate (binary') transition to an off mode is required in which case the DC fault mode fade-out mode is not assumed. Thus, under certain conditions, rather than abruptly terminate commanding application of brake torque by means of the braking system 22 when ceasing operation in the DC fault mode and transitioning to an off mode such as 'off' or 'disabled off', the LSP control system 12 gradually fades out the application of any brake torque applied by the braking system 22 as a consequence of being in the DC fault mode, before assuming the off or disabled off mode. This is at least in part so as to allow a driver time to adapt to driving without the system 12 applying brake torque automatically.

Similarly, if the LSP control system 12 transitions from the DC mode to a mode in which the LSP control system 12 is unable to command application of brake torque such as the standby mode, off mode or disabled off mode, the LSP control system 12 may assume the DC fade-out mode as an intermediate mode. In the DC fade-out mode, like the DC fault mode fade-out mode, the LSP control system 12 gradually reduces the amount of any brake torque commanded by the LSP control system 12, before assuming the target mode such as standby mode, off mode or disabled off mode.

The active standby mode is a mode assumed by the LSP control system 12 from the active mode if the driver over-rides the LSP control system 12 by depressing the accelerator pedal 161 to increase vehicle speed. If the driver subsequently releases the accelerator pedal with vehicle speed within the allowable range for the LSP control system 12 to operate in the active mode (i.e. a speed in the range 2-30 kph), the LSP control system 12 resumes operation in the active mode. If the speed is above the allowable range when the driver releases the accelerator pedal, the LSP control system 12 remains in the active standby mode until vehicle speed falls to a value within the allowable range. The LSP control system 12 then assumes the active mode. In some alternative embodiments the LSP control system 12 may remain in the active standby mode until vehicle speed falls to the prevailing value of LSP_set-speed, before assuming the active mode. Other arrangements may also be useful.

The DC standby mode is a mode assumed by the LSP control system 12 if whilst operating in the DC mode the driver over-rides the LSP control system 12 by depressing the accelerator pedal 161. If the driver subsequently releases the accelerator pedal, then when vehicle speed is within the allowable range for the LSP control system 12 to operate in the DC mode (i.e. a speed in the range 2-30 kph), the LSP control system 12 resumes operation in the DC mode. Other arrangements are also useful. In some embodiments the LSP control system 12 may be configured to assume DC mode from the DC standby mode and cause application of brake torque to slow the vehicle 100 when a driver releases the accelerator pedal 161 even at speeds above 30 kph. In some embodiments the LSP control system 12 may be configured to cause application of brake torque at speeds of up to 50 kph, 80 kph or any other suitable speed in order to cause vehicle speed to reduce to the LSP target speed LSP_set-speed. The LSP control system 12 may be configured to take into account negative torque applied by a powertrain due for example to engine over-run braking in determining an amount of brake torque required in order to cause a vehicle to slow at a desired rate. The LSP control system 12 may be configured to cause a vehicle to slow at a desired rate according to a predetermined deceleration profile.

In some embodiments, if the powertrain controller 11 receives a request for positive powertrain torque from the brake controller 13 as a consequence of a command from the LSP control system 12 and the LSP control system 12 is in the DC mode, the powertrain controller 11 causes the LSP control system 12 to assume the DC fault mode if the positive torque request is received more than a predetermined period after the LSP control system 12 has transitioned to the DC mode. As noted above, in the DC fault mode the LSP control system 12 is permitted to cause application of brake torque by the braking system 22 to control vehicle speed but is prevented from assuming the active or FF mode for the remainder of the current key cycle. In these circumstances, the LSP control system 12 assumes the DC fault mode substantially immediately with no requirement to blend the transition between the DC mode and DC fault mode.

As noted above, the predetermined period may be any suitable period such as 50 ms, 100 ms, 500 ms, 1000 ms or any other suitable period. The period may be set to a value such that any inherent system delay in receipt by the powertrain controller 11 of a torque request from the brake controller 13 as a consequence of a request issued by the LSP control system 12 prior to a transition from the active mode to the DC mode will not trigger a transition to the DC fault mode. It is to be understood that by inherent system delay is meant a delay in signal receipt that occurs during normal operation, for example due to a requirement to synchronize timing signals, or to transmit commands from the LSP control system 12 to the powertrain controller 11 at predetermined intervals as part of an inter-controller communications protocol.

In some embodiments, if the powertrain controller 11 receives a request for positive powertrain torque from the brake controller 13 as a consequence of a command from the LSP control system 12 and the LSP control system 12 is in the DC fault mode or DC fault mode fade out mode only, the powertrain controller 11 causes the LSP control system 12 to assume the disabled off mode if the positive torque request is received more than a predetermined period after the LSP control system 12 has transitioned to the DC fault mode or DC fault mode fade out mode. In the present embodiment the predetermined period is a period of 500 ms. However the predetermined period may be any suitable period such as 50 ms, 100 ms, 1000 ms or any other suitable period. The LSP control system 12 may be configured substantially abruptly to terminate application of any negative (brake) torque requested by the LSP control system 12 when the transition to the disabled off mode is commanded even if the system 12 is in the processes of fading out any negative brake torque that is being applied as a result of a request issued by the LSP control system 12

In some embodiments, in addition or instead, if the powertrain controller 11 receives a request for positive powertrain torque from the brake controller 13 as a consequence of a command from the LSP control system 12 and the signal S_mode indicates that the LSP control system 12 is in the DC mode, DC standby mode, DC mode fade-out mode or active standby mode, the powertrain controller 11 causes the LSP control system 12 to assume the disabled off mode if the positive torque request is received over a sustained period of more than a predetermined period. In the present embodiment the predetermined period is substantially 500 ms. However the predetermined period may be any suitable period such as 100 ms, 1000 ms or any other suitable period. The LSP control system 12 is configured gradually to cause fade-out of any negative (brake) torque being applied as a consequence of a command from the LSP control system 12 when the transition to the disabled off mode is commanded. The fade-out of brake torque may be accomplished by assuming the DC mode fade-out mode or DC fault mode fade-out mode if they have not already been assumed.

In some embodiments, the LSP control system 12 is caused to assume the disabled off mode if the powertrain controller 11 receives a request for positive powertrain torque from the brake controller 13 as a consequence of a command from the LSP control system 12 and signal S_mode indicates that the LSP control system 12 is in the DC fault mode or DC fault mode fade-out mode, as well as when the signal indicates the LSP control system 12 is in the DC mode, DC standby mode, DC mode fade-out mode or active standby mode.

It is to be understood that in some embodiments, instead of gradually fading out negative brake torque, the LSP control system 12 may be configured to abruptly terminate application of any negative brake torque as a consequence of a command by the LSP control system 12. Thus, if a request for positive powertrain torque is received over a sustained period of more than the predetermined period when the LSP control system 12 is in the DC mode, DC standby mode, DC fault mode, DC mode fade-out mode, DC fault mode fade-out mode or active standby mode the system may abruptly terminate application of brake torque caused by the LSP control system 12. It is to be understood that the braking system 12 continues to respond to driver brake commands via the brake pedal 163.

It is to be understood that in the present embodiment if a driver switches off the LSP control system 12 manually, the LSP control system 12 is configured gradually to cause fade-out of any negative (brake) torque being applied as a consequence of a command from the LSP control system 12. This feature has the advantage that vehicle composure may be enhanced.

Figure 4:
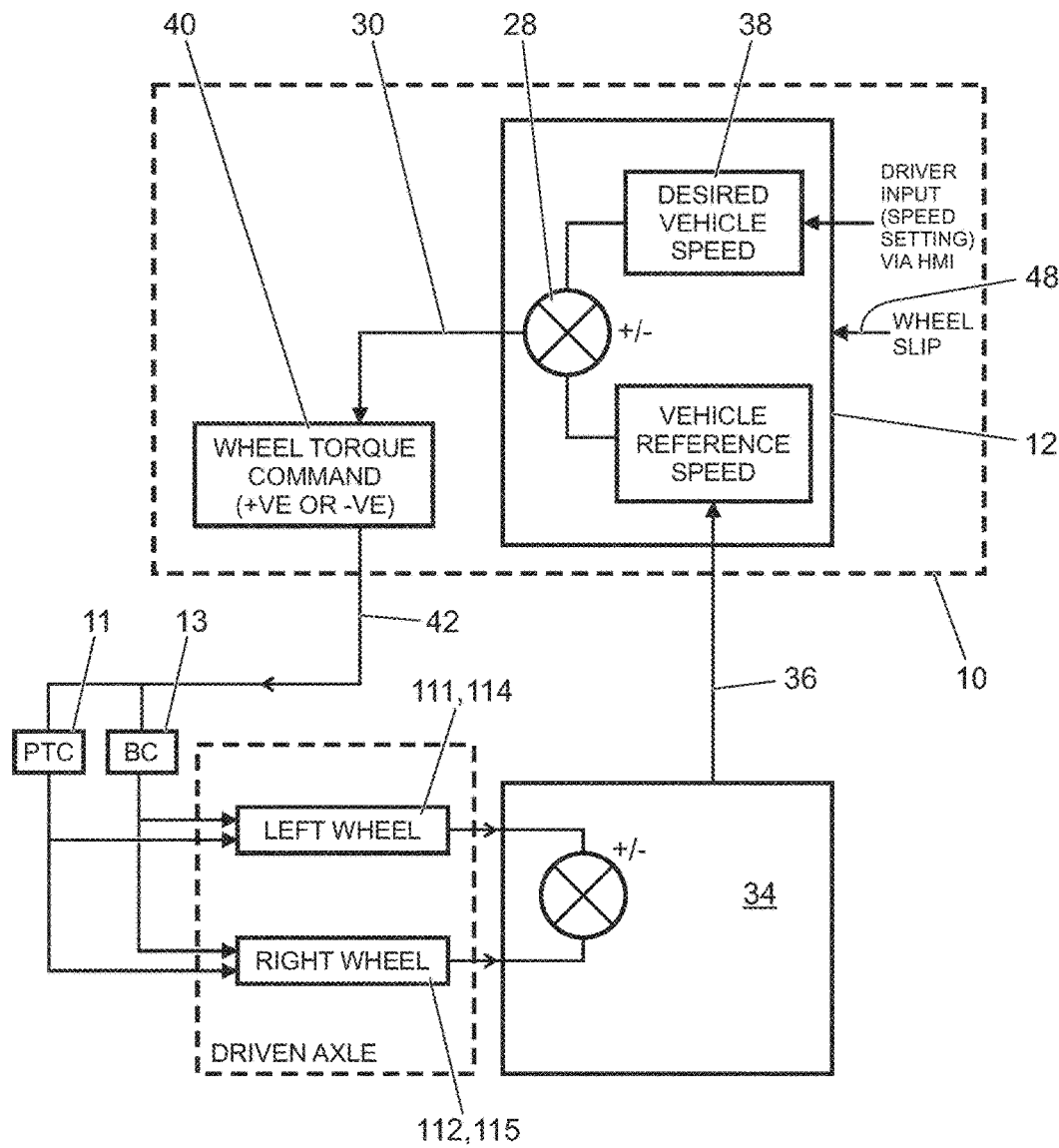
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed calculator 34 provides a vehicle speed signal 36 indicative of vehicle speed to the LSP control system 12. The speed calculator 34 determines vehicle speed based on wheel speed signals provided by wheel speed sensors 111S, 112S, 114S, 115S. The LSP control system 12 includes a comparator 28 which compares the LSP control system set-speed LSP_set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing the amount of any positive powertrain torque delivered to a wheel, by increasing the amount of any negative powertrain torque delivered to a wheel, for example by reducing an amount of air and/or fuel supplied to an engine 121, and/or by increasing a braking force on a wheel. It is to be understood that in some embodiments in which a powertrain 129 has one or more electric machines operable as a generator, negative torque may be applied by the powertrain 129 to one or more wheels by means of the electric machine. As noted above negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the brake controller 13. The brake controller 13 in turn controls a net torque applied to the vehicle wheels 111-115 by commanding application of brake torque via the brakes 111B, 112B, 114B, 115B and/or positive drive torque by commanding powertrain controller 11 to deliver a required amount of powertrain torque. The net torque may be increased or decreased depending on whether the evaluator unit 40 demands positive or negative torque. In order to cause application of the necessary positive or negative torque to the wheels, the brake controller 13 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle 100 at the required speed, but in another embodiment torque may be applied to the wheels collectively to maintain the required speed. In some embodiments, the powertrain controller 11 may be operable to control an amount of torque applied to one or more wheels at least in part by controlling a driveline component such as a rear drive unit, front drive unit, differential or any other suitable component. For example, one or more components of the driveline 130 may include one or more clutches operable to allow an amount of torque applied to wheels of a given axle to be controlled independently of the torque applied to wheels of another axle, and/or the amount of torque applied to one or more individual wheels to be controlled independently of other wheels. Other arrangements are also useful.

Where a powertrain 129 includes one or more electric machines, for example one or more propulsion motors and/or generators, the powertrain controller 11 may be operable to modulate or control the amount of torque applied to one or more wheels at least in part by means of the one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation of the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle 100 must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the LSP function by depressing the accelerator pedal 161 and/or brake pedal 163 to adjust the vehicle speed in a positive or negative sense. However, absent any override by a user, in the event that a wheel slip event is detected via signal 48, the LSP control system 12 remains active and control of vehicle speed by the LSP control system 12 is not terminated. As shown in FIG. 4, this may be implemented by providing a wheel slip event signal 48 to the LSP control system 12 which is then managed by the LSP control system 12 and/or brake controller 13. In the embodiment shown in FIG. 1 the SCS 14S generates the wheel slip event signal 48 and supplies it to the LSP control system 12 and cruise control system 16.

A wheel slip event is triggered when a loss of traction occurs at any one of the vehicle wheels. Wheels and tires may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation in such conditions can be a difficult and often stressful experience for the driver and may result in an uncomfortable ride.

The vehicle 100 is also provided with additional sensors (not shown) which are representative of a variety of different parameters associated with vehicle motion and status. The signals from the sensors provide, or are used to calculate, a plurality of driving condition indicators (also referred to as terrain indicators) which are indicative of the nature of the terrain conditions over which the vehicle is travelling. Suitable sensor data may be provided by inertial systems unique to the LSP or HDC control system 12, 12HD or systems that form part of another vehicle sub-system such as an occupant restraint system or any other sub-system which may provide data from sensors such as gyros and/or accelerometers that may be indicative of vehicle body movement and may provide a useful input to the LSP and/or HDC control systems 12, 12HD.

The sensors on the vehicle 100 include sensors which provide continuous sensor outputs to the VCU 10, including wheel speed sensors, as mentioned previously and as shown in FIG. 1, and other sensors (not shown) such as an ambient temperature sensor, an atmospheric pressure sensor, tire pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14S, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used. Other sensors may be useful in addition or instead in some embodiments.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB2492748, GB2492655 and GB2499252, the contents of each of which is incorporated herein by reference.

The nature of the terrain over which the vehicle is travelling (as determined by reference to the selected control mode) may also be utilized in the LSP control system 12 to determine an appropriate increase or decrease in vehicle speed. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

A-438 Driver Throttle Override

In the present embodiment, the LSP control system 12 is configured to determine the speed at which the vehicle 100 is to be caused to operate at a given moment in time, LSP_set-speed, in dependence on the value of user_set-speed and a number of parameters associated with the vehicle 100. In particular, the LSP control system 12 is configured to cause the vehicle 100 to operate in accordance with the lowest of six values of vehicle set speed unless the driver overrides control of vehicle speed by depressing the accelerator pedal 161 by a sufficient amount. That is, provided the driver does not override vehicle speed control by means of the accelerator pedal 161, the LSP control system 12 sets the value of target_speed to the lowest of six values of speed. The six speed values are (a) a value of target speed requested by a user, user_set-speed, described above; (b) a maximum vehicle speed Psng_Excit_v calculated in dependence on the value of an occupant excitation parameter Psng_Excit, the value of Psng_Excit being set in dependence on vehicle pitch acceleration, roll acceleration and heave acceleration; (c) a maximum speed steering_angle_v that is set in dependence on steering angle and vehicle speed; (d) a maximum speed sideslope_v that is set in dependence on a value of surface side slope; (e) a maximum speed grad_v that is set in dependence on surface gradient; and (f) a maximum speed warp_v or warp speed that is set in dependence on vehicle suspension articulation, also referred to as suspension warp. Optionally, the inputs may include a further maximum speed value that is set in dependence on whether the vehicle is wading. In some embodiments this maximum speed value may be set in dependence at least in part on a depth of liquid through which the vehicle is wading. Other parameters are also useful. Other speed values may also be useful.

Calculation of the values of the six values of target speed are also discussed in co-pending international patent application WO2014/027069, the content of which is hereby incorporated by reference.

The LSP control system 12 is configured to receive inputs corresponding to a number of vehicle parameters. The parameters include: (a) a current vehicle reference value of surface coefficient of friction, being a value calculated based on values of one or more parameters such as an amount of torque applied to a wheel at which excessive wheel slip has been induced; (b) a value of expected surface coefficient of friction corresponding to a currently selected vehicle driving mode, being a prescribed value for each driving mode; (c) a current value of steering angle, corresponding to a steerable road wheel angle or steering wheel position; (d) a current yaw rate of the vehicle (determined by reference to an output of an accelerometer); (e) a current measured value of lateral acceleration (also determined by reference to an output of an accelerometer); (f) a current measured value of surface roughness (determined by reference to suspension articulation); (g) a current location of the vehicle (determined by reference to a global satellite positioning system (GPS) output); and (h) information obtained by means of a camera system. The preceding list is intended to be illustrative of an example only and is not intended to be limiting, other inputs also being useful in addition or instead.

The information obtained by means of a camera system may include for example an alert in the event that it is determined that the vehicle 10 may be about to depart from an off-road lane or track. In some embodiments, one or more systems of the vehicle 100, optionally the LSP control system 12, may be configured to detect terrain ahead of the vehicle that may affect the value of Psng_Excit. That is, the LSP control system 12 may predict that occupant excitation may be adversely or positively affected by terrain ahead of the vehicle based on analysis of one or more images of terrain in a path of the vehicle 100. Thus the LSP control system 12 may be configured to change the value of Psng_Excit or otherwise affect vehicle speed in anticipation of a change in the value of Psng_Excit if the vehicle 100 continues at its current rate of progress. This is in contrast to reactive evaluation of terrain by reference to the vehicle parameters discussed above.

It is to be understood that in some embodiments a controller or system other than the LSP control system 12 may be configured to determine the value of Psng_Excit.

It is to be understood that if when the value of pedal_tq_rq is greater than that of LSP_tq_rq, i.e. when a driver overrides the LSP control system 12 by forcing the powertrain 129 to develop a greater amount of torque, the LSP control system 12 could be caused to assume a standby mode during the period of override, in which the LSP control system 12 is not involved in the determination of the amount of powertrain torque required. However, the present applicant has recognized this may result in a form of response of the powertrain 129 to the increase in torque demand during driver accelerator pedal override that is different from that which would have occurred if a driver had increased the value of user_set-speed in order to cause an increase in vehicle speed by means of the LSP control system 12 rather than by depressing the accelerator pedal 161.

This difference in form of response may cause a reduction in vehicle composure at least in part because in the present embodiment when in the active mode the LSP control system 12 limits the rate of acceleration and deceleration of the vehicle 100.

In order to mitigate this problem the present applicant has conceived a system and method of operation of a vehicle 100 in which the speed control system may remain actively involved in the control of the amount of torque generated by the powertrain 129, so as to reduce or prevent loss of vehicle composure, during accelerator pedal override. In the present embodiment the LSP control system 12 remains in the active mode during accelerator pedal override and continues to limit the rate of acceleration and deceleration of the vehicle 100.

Figure 7:
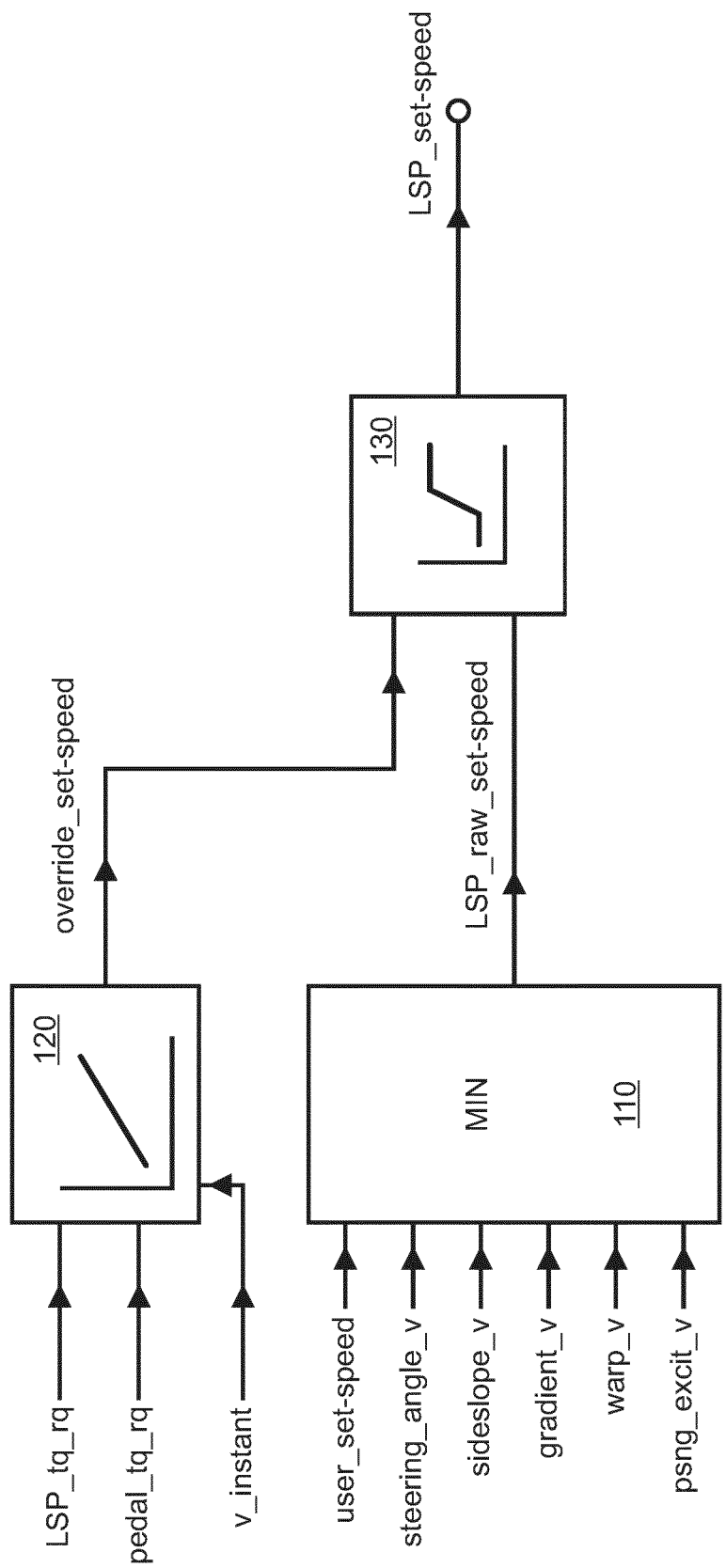
FIG. 7 is a schematic illustration of a portion of a controller according to an embodiment of the present invention.

FIG. 7 is a schematic illustration of the manner in which the LSP control system 12 causes the vehicle 100 to operate in accordance with the value of LSP_set-speed when the LSP control system 12 is in the active mode.

Function block 110 is a minimizer function block 110 that receives six signal inputs corresponding to the six values of set-speed described above: user_set-speed, steering-angle_v, sideslope_v, gradient_v, warp_v and psng_excit_v. The minimizer function block 110 outputs a signal LSP_raw_set-speed that is substantially equal to the lower of the six signals input to the block 110.

Function block 120 receives an input signal LSP_tq_rq being a virtual accelerator pedal position signal generated by the LSP control system 12, a signal pedal_tq_rq indicative of an actual position of the accelerator pedal 161, and a signal v_instant indicative of an instant speed of the vehicle 100. In the present embodiment, the signal LSP_tq_req is generated by the LSP control system 12 in order to cause the powertrain 129 to develop an amount of powertrain torque required to cause the vehicle 100 to operate in accordance with the prevailing value of LSP_set-speed. By generating the signal LSP_tq_rq, an interface between the powertrain controller 11 and LSP control system 12 may be simplified, since in some embodiments the powertrain controller 11 need only receive signal LSP_tq_rq from the LSP control system 12 in order to cause the powertrain 129 to develop the required amount of torque. It is to be understood that the powertrain controller 11 may in some embodiments be configured to generate an amount of torque according to the signal LSP_tq_rq only if the LSP control system 12 is in the active mode.

The signal v_instant corresponds substantially to vehicle speed signal 36.

Function block 120 is configured to compare the signals LSP_tq_rq and pedal_tq_rq. If the signal LSP_tq_rq is greater than the signal pedal_tq_rq the function block 120 outputs to function block 130 a signal override_set-speed that is set substantially to zero. If the signal pedal_tq_rq is greater than the signal LSP_tq_rq, function block 120 feeds the signal pedal_tq_rq to a sub-block 120a of the function block 120. The LSP control system 12 remains in the active mode even when pedal_tq_rq_ is greater than LSP_tq_rq unless the accelerator pedal 161 is depressed by more than 80% of its maximum range of travel. In this latter case, the LSP control system 12 assumes the standby mode and the signal pedal_tq_rq is fed directly to the powertrain controller 11.

Figure 8:
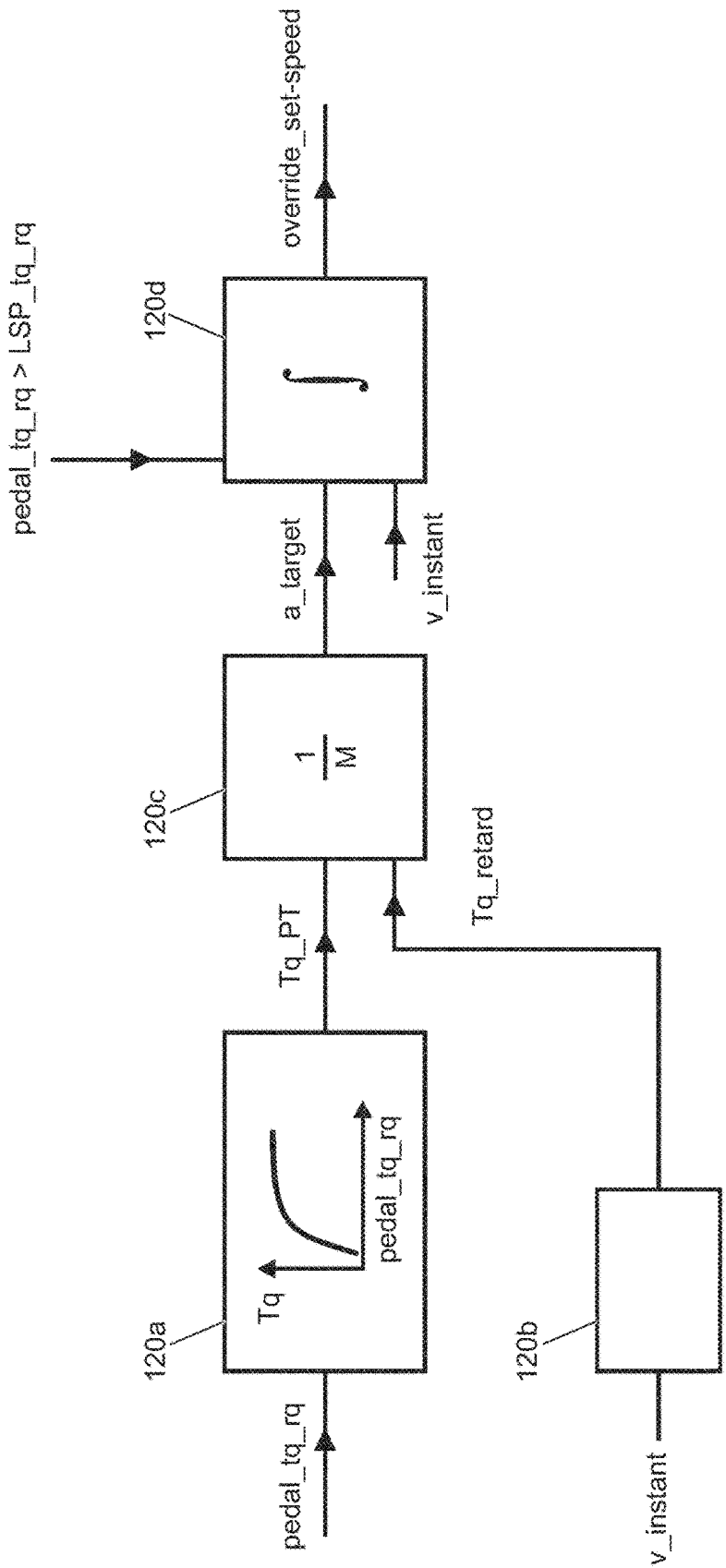
FIG. 8 is a schematic illustration of a portion of a controller according to an embodiments of the present invention in further detail.

FIG. 8 illustrates four sub-blocks 120a-d of the function block 120. The purpose of sub-blocks 120a-d is to generate an 'effective' value of set-speed value, herein referred to as an accelerator pedal override set-speed value, override_set-speed, which is then used to cause the LSP control system 12 to cause the vehicle 100 to experience an increase in speed in accordance with driver torque demand as determined by reference to pedal_tq_rq. This is done by setting the parameter LSP_set-speed equal to override_set-speed.

Sub-block 120a is configured to feed the value of parameter pedal_tq_rq into a look-up table in order to generate a value of an amount of powertrain torque, Tq_PT, corresponding to the value of pedal_tq_rq. The value of PT_tq is output to a function block 120c.

In the present embodiment the value of Tq_PT corresponds substantially to that which would be developed by the powertrain controller 11 if the LSP control system were to assume the standby mode and the signal pedal_tq_req were fed directly to the powertrain controller 11 rather than to the function block 120.

In some embodiments the value of Tq_PT may be different from that which would be developed by the powertrain controller 11 if the signal pedal_tq_req were fed directly to the powertrain controller 11. Other arrangements may also be useful.

Function block 120b receives as an input a value of instant vehicle speed, v_instant, corresponding to vehicle speed signal 36. Based on v_instant, function block 120b calculates a retarding torque on the powertrain of the vehicle, Tq_retard, due to aerodynamic drag and optionally one or more other drag torques acting on a vehicle powertrain 129 such as hydraulic and frictional torques associated with the transmission 124 and driveline 131. The value of Tq_retard is fed as an input to function block 120c.

Function block 120c calculates a value of acceleration of the vehicle 100, a_target, that would be expected to result from the value of Tq_PT in combination with the value of Tq_retard. The value of a_target is fed to an integrator function block 120d that calculates an expected instant value of speed of the vehicle based on the value of a_target by integrating the value of a_target over time. The integrator function block 120d sets the value of a parameter override_set-speed substantially equal to this expected instant value of speed and outputs this parameter to function block 130 of FIG. 7. It is to be understood that, when the value of pedal_tq_rq initially exceeds LSP_tq_rq, during a given period in which pedal_tq_rq exceeds LSP_tq_rq, the value of override_set-speed is set substantially equal to the instant vehicle speed v_instant in the present embodiment.

The value of override_set-speed is fed to function block 130 of FIG. 7.

As noted above function block 130 receives input signals LSP_raw_set-speed and override_set-speed.

Block 130 takes the larger of the two values override_set-speed and LSP_raw_set-speed and sets the value of LSP_set-speed to the larger of the two. The value LSP_set-speed is the output from the function block 130 and the LSP control system 12 attempts to cause the vehicle 100 to travel at a speed substantially equal to LSP_set-speed.

In attempting to cause the vehicle 100 to travel at the speed LSP_set-speed, the system 12 attempts to ensure that a rate of acceleration and deceleration of the vehicle 100 does not exceed a saturation rate of $1.25$ $ms^{-2}$. Other values of positive or negative acceleration, i.e. maximum values of positive vehicle and acceleration and deceleration, may also be useful.

When the value of pedal_tq_rq falls below LSP_tq_rq for more than a predetermined period of time, the LSP control system 12 causes the value of LSP_set-speed to transition smoothly back to the value of LSP_raw_set-speed. In some embodiments this may be performed by blending the values of override_set-speed and LSP_raw_set-speed.

Figure 9:
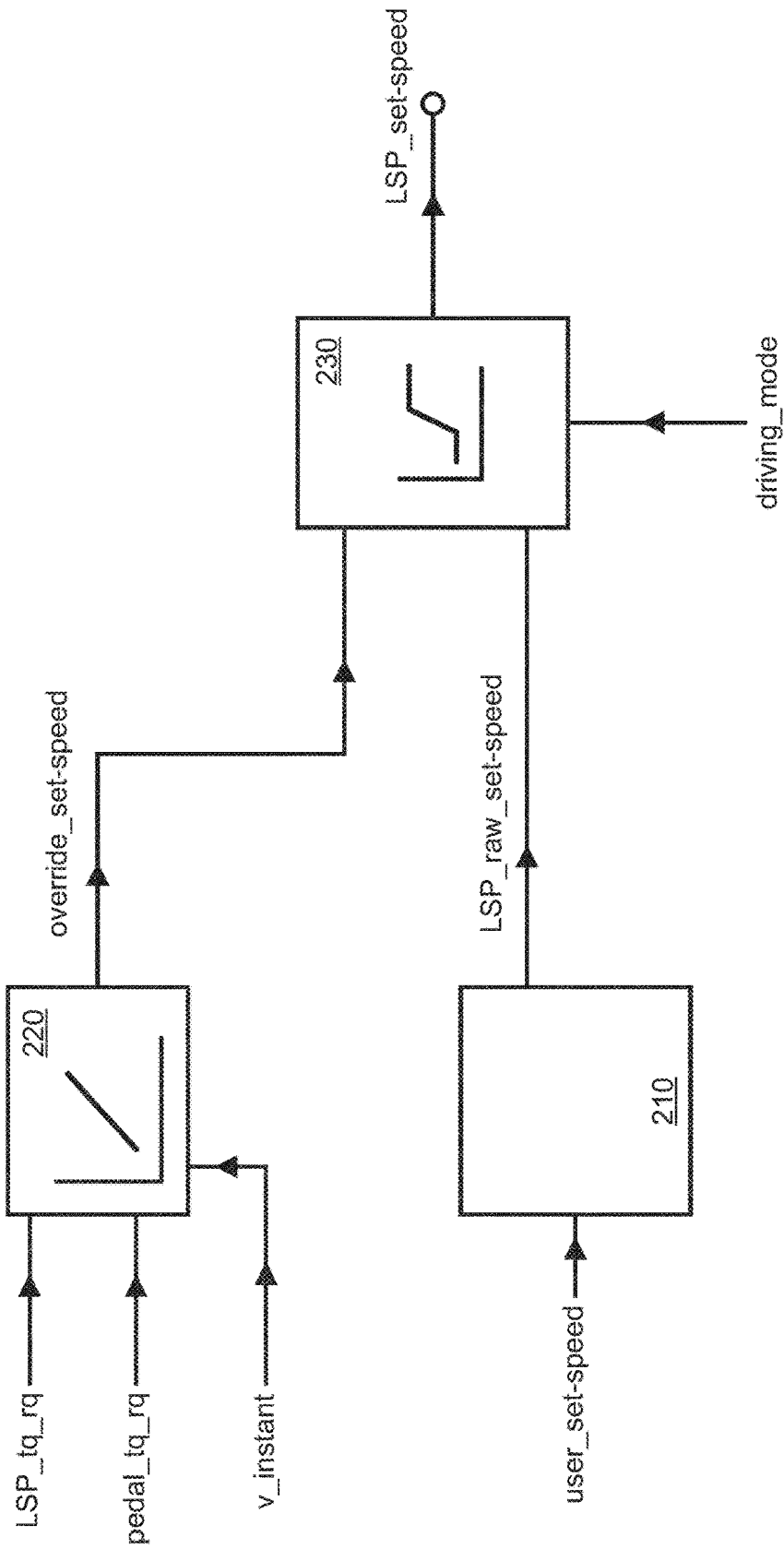
FIG. 9 is a schematic illustration of a portion of a controller according to a further embodiment of the present invention.

FIG. 9 is a schematic illustration of a portion of an LSP control system according to a further embodiment of the present invention, and corresponds to the portion of the LSP control system 12 of the previous embodiment illustrated in FIG. 7. Like features of the portion of FIG. 9 to those of the portion of FIG. 7 are shown with like reference numerals incremented by 100.

The portion of the control system illustrated in FIG. 9 differs from that of the embodiment of FIG. 7 in that minimizer function block 110 of the embodiment of FIG. 7 is replaced by a function block 210 which receives as an input the value of user_set-speed and outputs to function block 130 a signal LSP_raw_set-speed which is set substantially equal to the value of user_set-speed. It is to be understood that in some embodiments function block 210 may receive as inputs signals corresponding to a plurality of speed values, as in the case of minimizer function block 120 of the embodiment of FIG. 7, and output a value of LSP_raw_set-speed which is set substantially equal to the lower of the speeds input thereto.

The portion of the control system illustrated in FIG. 9 also differs from that of the embodiment of FIG. 7 in that function block 230 additionally receives as an input the signal driving_mode. The function block 230 is configured to select an acceleration profile (which may also be referred to as a speed profile) from a plurality of stored profiles in dependence on the signal driving_mode. The acceleration or speed profiles are stored in a memory of the LSP control system 12 and the profile to be employed at a given moment in time is determined in dependence on driving_mode by reference to a look-up table. In use, the control system 12 causes the vehicle to operate in accordance with the value of user_set-speed unless it is determined that the control system 12 is to cause the vehicle to operate in accordance with the value of override_set-speed because override_set-speed exceeds LSP_raw_set-speed in the manner described above with respect to FIG. 7 and FIG. 8. If the control system 12 is causing the vehicle to operate in accordance with the value of override_set-speed and the value of v_instant is less than the value of override_set-speed, the control system 12 causes the vehicle to accelerate from the instant speed v_instant to the speed override_set-speed at a rate determined according to the acceleration or speed profile that has been selected by the function block 230 in dependence on the parameter driving_mode.

In the present embodiment the VCU 10 stores a plurality of acceleration profiles corresponding to positive values of vehicle acceleration. These profiles are employed when v_ref is less than LSP_set-speed and an increase in v_ref is required. In some embodiments, in addition the VCU 10 stores a plurality of acceleration profiles corresponding to negative values of vehicle acceleration, employed when v_ref is greater than LSP_set-speed and a decrease in v_ref is required.

A plurality of acceleration profiles in respect of positive vehicle acceleration are stored in the present embodiment because in certain terrain conditions such as when driving over sand, it may be desirable to have relative high acceleration profiles that demand higher rates of acceleration whilst in certain other terrain conditions it may be desirable to have positive acceleration profiles that demand lower rates of acceleration, such as when driving over grass, gravel or snow.

Selection from a plurality of positive and negative acceleration profiles is particularly advantageous. For example, when an increase in vehicle speed is required when driving on sandy terrain, it is typically desirable to accelerate at a relatively high rate of acceleration, whilst when a decrease in vehicle speed is required when driving on sandy terrain it is typically desirable to decelerate at a relatively low rate in order to reduce a risk of sink of one or more wheels into the driving surface. Sink of one or more wheels into the driving surface may result from skid associated with excessive braking on deformable surfaces such as sand. In contrast, when operating on surfaces such as grass, relatively low levels of positive and negative acceleration are desirable in order to reduce slip and reduce the extent to which the surface is modified as the vehicle progresses over the surface.

It will be appreciated that, alternatively, a single common acceleration profile may be used for positive and negative acceleration. When negative acceleration is required, the VCU 10 may simply reverse the sign of the stored positive acceleration profile in order to determine the rate of negative acceleration (or the speed of the vehicle) at a given moment in time.

Some embodiments of the present invention have the advantage that a speed control system such as LSP control system 12 may continue to control vehicle speed even when a driver overrides the speed control system by depressing the accelerator pedal. Consequently, the speed control system is able to ensure that the rate of acceleration of the vehicle does not exceed a maximum acceleration value. This enables vehicle composure to be maintained even when the driver overrides the speed control system. Furthermore, in some embodiments the speed control system may set the maximum acceleration rate, and/or an acceleration profile, according to a vehicle parameter such as a driving mode in which a vehicle is operating, optionally according to the nature of terrain over which the vehicle is operating. Thus, when operating in off-road conditions, the LSP control system 12 may adapt the acceleration profile according to the prevailing terrain even if a driver overrides the speed control system by demanding an amount of torque exceeding that which the speed control system has demanded in order to control vehicle speed according to the prevailing set-speed value. As described above, the prevailing set-speed value may be a user set set-speed value or a lower set-speed value if otherwise determined to be appropriate, for example due to the terrain over which the vehicle is travelling or one or more other factors such as a value or state of one or more vehicle parameters.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A speed control system for a motor vehicle, the speed control system comprising:
an accelerator pedal displaceable by a driver to indicate a driver drive demand via displacement of the accelerator pedal; and
a processor in communication with the accelerator pedal, the processor configured to cause automatic operation of the vehicle in accordance with a first target speed value stored by the system at least in part by controlling automatically an amount of drive torque applied to one or more wheels by a powertrain, the processor being configured to receive an instantaneous driver drive demand signal in response to a prevailing driver displacement of the accelerator pedal; and
wherein the processor is configured to determine a second target speed value greater than the first target speed value in dependence on the instantaneous driver drive demand signal;
the processor being further configured to cause automatic acceleration of the vehicle from the first target speed value to the second target speed value in accordance with the instantaneous driver drive demand signal and at a rate not exceeding a maximum rate of acceleration;
wherein the processor is configured to cause the second target speed value gradually to become equal to the first target speed value when the instantaneous driver demand signal corresponds to an amount of drive torque substantially equal to or less than that required by the system to cause the vehicle to operate in accordance with the first target speed value.

2. The system according to claim 1 configured to cause the vehicle to accelerate from the first target speed value to the second target speed value according to a predetermined speed or acceleration profile.

3. The system according to claim 2 wherein the predetermined speed or acceleration profile is dependent on at least one vehicle parameter.

4. The system according to claim 2 wherein the predetermined speed or acceleration profile is dependent on the identity of a driving mode, selected from a plurality of driving modes, in which the vehicle is operating.

5. The system according to claim 4 configured to receive a signal indicative of the driving mode in which a user requires the vehicle to operate.

6. The system according to claim 5 in combination with a user-operable driving mode control by means of which the signal indicative of the driving mode in which a user requires the vehicle to operate is generated.

7. The system according to claim 4 in combination with an automatic driving mode selector configured to select automatically a driving mode appropriate to a driving surface over which a vehicle is driving when the vehicle is operated in an automatic driving mode selection mode.

8. The system according to claim 4 wherein the driving modes are control modes of at least one subsystem of a vehicle selected from amongst an engine management system, a transmission system, a steering system, a brakes system and a suspension system, the speed control system being provided in combination with a subsystem controller for initiating control of the or each of the vehicle subsystems in the selected one of the plurality of subsystem control modes, each of the subsystem control modes corresponding to one or more different driving surfaces, wherein the system is configured to determine the maximum rate of acceleration of the vehicle in dependence at least in part on the first and second target speed values.

9. The system according to claim 1 configured to monitor an amount of slip of one or more wheels of the vehicle whilst causing automatic acceleration of the vehicle from the first target speed value to the second target speed value, the system being configured to:
reduce a net torque applied to one or more wheels in dependence on the amount of slip of one or more wheels thereby to reduce slip when slip exceeds a predetermined amount, or
control a net torque applied to one or more wheels in dependence on the amount of slip of one or more wheels thereby to prevent slip from exceeding a predetermined amount.

10. The system according to claim 1 configured to cause a powertrain to commence causing the vehicle to operate in accordance with the second target speed value in dependence on the instantaneous driver drive demand signal when the instantaneous driver demand signal corresponds to a greater drive torque than that required by the system to cause the vehicle to operate in accordance with the first target speed value.

11. The system according to claim 1 configured to calculate a rate of acceleration of a vehicle that would be expected according to the instantaneous driver drive demand signal if the control system was in a first mode and to calculate the second target speed value in dependence on the expected rate of acceleration.

12. The system according to claim 11 wherein the second target speed value corresponds to an integrated value of the expected rate of acceleration of a vehicle according to the prevailing instantaneous driver drive demand signal.

13. The system according to claim 1 configured to recalculate the second target speed value substantially continuously when the instantaneous driver drive demand signal corresponds to an amount of drive torque that is greater than an amount of drive torque required by the system to cause the vehicle to operate in accordance with the first target speed value.

14. The system according to claim 1 configured to allow a user to input a target speed value, the system being configured to set the first target speed value equal to the target speed value input by the user, wherein the system is further configured to set the first target speed value to a value lower than the target speed value input by the user in dependence on one or more parameters.

15. The system according to claim 14 configured to set the first target speed value to a value lower than the target speed value input by the user in dependence on one or more parameters the parameters being selected from amongst one or more parameters indicative of movement of at least a portion of a body of a vehicle, one or more parameters indicative of movement of at least a portion of a body of an occupant, and one or more parameters indicative of the nature of terrain over which a vehicle is driving.

16. A vehicle comprising a body, a plurality of wheels, a powertrain to drive said wheels, a braking system to brake said wheels, and the system according to claim 1.

17. A method of operating a vehicle comprising:
  causing the vehicle to operate in accordance with a first target speed value stored by the system at least in part by controlling automatically an amount of drive torque applied to one or more wheels by a powertrain;
  receiving an instantaneous driver drive demand signal in response to a prevailing driver displacement of an accelerator pedal;
  determining a second target speed value greater than the first target speed value in dependence on the instantaneous driver drive demand signal;
  causing automatic acceleration of the vehicle from the first target speed value to the second target speed value in accordance with the instantaneous driver drive demand signal and at a rate not exceeding a maximum rate of acceleration; and
  causing the second target speed value gradually to become equal to the first target speed value when the instantaneous driver demand signal corresponds to an amount of drive torque substantially equal to or less than that required by the system to cause the vehicle to operate in accordance with the first target speed value.

18. A non-transitory carrier medium carrying a computer readable code for controlling a vehicle to carry out the method of claim 17.

19. A computer program product stored in a non-transitory carrier medium, the computer program product executable on a processor so as to implement the method of claim 17.

* * * * *